US012192982B2

(12) United States Patent
Christoffersson et al.

(10) Patent No.: US 12,192,982 B2
(45) Date of Patent: Jan. 7, 2025

(54) APPARATUSES AND METHODS FOR USING GROUP BUFFER STATUS REPORTS

(71) Applicant: Telefonaktiebolaget LM Ericsson (PUBL), Stockholm (SE)

(72) Inventors: Jan Christoffersson, Luleå (SE); Mårten Ericson, Gammelstad (SE); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 309 days.

(21) Appl. No.: 17/637,854

(22) PCT Filed: Sep. 18, 2019

(86) PCT No.: PCT/SE2019/050882
§ 371 (c)(1),
(2) Date: Feb. 24, 2022

(87) PCT Pub. No.: WO2021/054872
PCT Pub. Date: Mar. 25, 2021

(65) Prior Publication Data
US 2022/0279529 A1     Sep. 1, 2022

(51) Int. Cl.
*H04W 72/121*   (2023.01)
*H04W 28/02*    (2009.01)
(Continued)

(52) U.S. Cl.
CPC ..... *H04W 72/121* (2013.01); *H04W 28/0278* (2013.01); *H04W 72/1268* (2013.01); *H04W 72/21* (2023.01)

(58) Field of Classification Search
CPC ............ H04W 28/0278; H04W 72/21
(Continued)

(56) References Cited

U.S. PATENT DOCUMENTS

2013/0029680 A1   1/2013  Park et al.
2018/0070264 A1*  3/2018  Saiwai ............... H04W 72/04

FOREIGN PATENT DOCUMENTS

EP    2 999 287 A1    3/2016
EP    3 232 727 A1   10/2017
(Continued)

OTHER PUBLICATIONS

3GPP TS 22.468 v12.1.0; Technical Specification; 3rd Generation Partnership Project; Technical Specification Group Services and System Aspects; Group Communication System Enablers for LTE (GCSE_LTE) (Release 12)—Sep. 2014.
(Continued)

*Primary Examiner* — Kiet M Doan
(74) *Attorney, Agent, or Firm* — Baker Botts L.L.P.

(57) ABSTRACT

The present disclosure relates to radio network communication. In one of its aspects, the disclosure presented herein concerns a method performed by a first UE for transmitting group Buffer Status Reports (BSRs) for group transmissions to a Base Station (BS) in a wireless communication system. The wireless communication system comprises the BS and a plurality of UEs, including the first UE. The plurality of UEs are assigned to a group, wherein at least one of the UEs within the assigned group has data for group transmission to the BS. The method comprises transmitting, to the BS, a group BSR. The group BSR comprises at least one identifier identifying a request for SideLink (SL) transmissions within the assigned group and identifying a request for cooperative UpLink (UL) group transmissions of data by the UEs within the assigned group to the BS once the SL transmissions to the UEs within the assigned group are completed.

15 Claims, 14 Drawing Sheets

(51) Int. Cl.
*H04W 72/1268* (2023.01)
*H04W 72/21* (2023.01)

(58) Field of Classification Search
USPC ........................................ 370/329, 235, 230
See application file for complete search history.

(56) References Cited

FOREIGN PATENT DOCUMENTS

| EP | 3 240 354 | A1 | 11/2017 |
|---|---|---|---|
| WO | 2015 163798 | A1 | 10/2015 |
| WO | 2017 117253 | A1 | 7/2017 |
| WO | 2017 182068 | A1 | 10/2017 |

OTHER PUBLICATIONS

3GPP TS 23.468 v12.5.0; Technical Specification; 3rd Generation Partnership Project; Technical Specification Group Services and System Aspects; Group Communication System Enablers for LTE (GCSE_LTE); Stage 2 (Release 12)—Jun. 2015.
3GPP TS 38.321 v15.6.0; Technical Specification; 3rd Generation Partnership Project; Technical Specification Group Radio Access Network; NR; Medium Access Control (MAC) protocol specification (Release 15)—Jun. 2019.
Wilfried Elmenreich et al., Building Blocks of Cooperative Relaying in Wireless Systems, Article in e & i Electrotechnik and Informationstechnik—Oct. 2008.
Xi Luan et al., Distributed Joint Cluster Formation and Resource Allocation Scheme for Cooperative Data Collection in Virtual MIMO-Based M2M Networks, Institution of Advanced Communications, EECS, Peking University, Beijing, China , International Journal of Antennas and Propagation, vol. 2015, Article ID 348086, 10 pages—Sep. 1, 2014.
PCT International Search Report issued for International application No. PCT/SE2019/050882—Jun. 10, 2020.
PCT Written Opinion of the International Searching Authority issued for International application No. PCT/SE2019/050882—Jun. 10, 2020.

\* cited by examiner

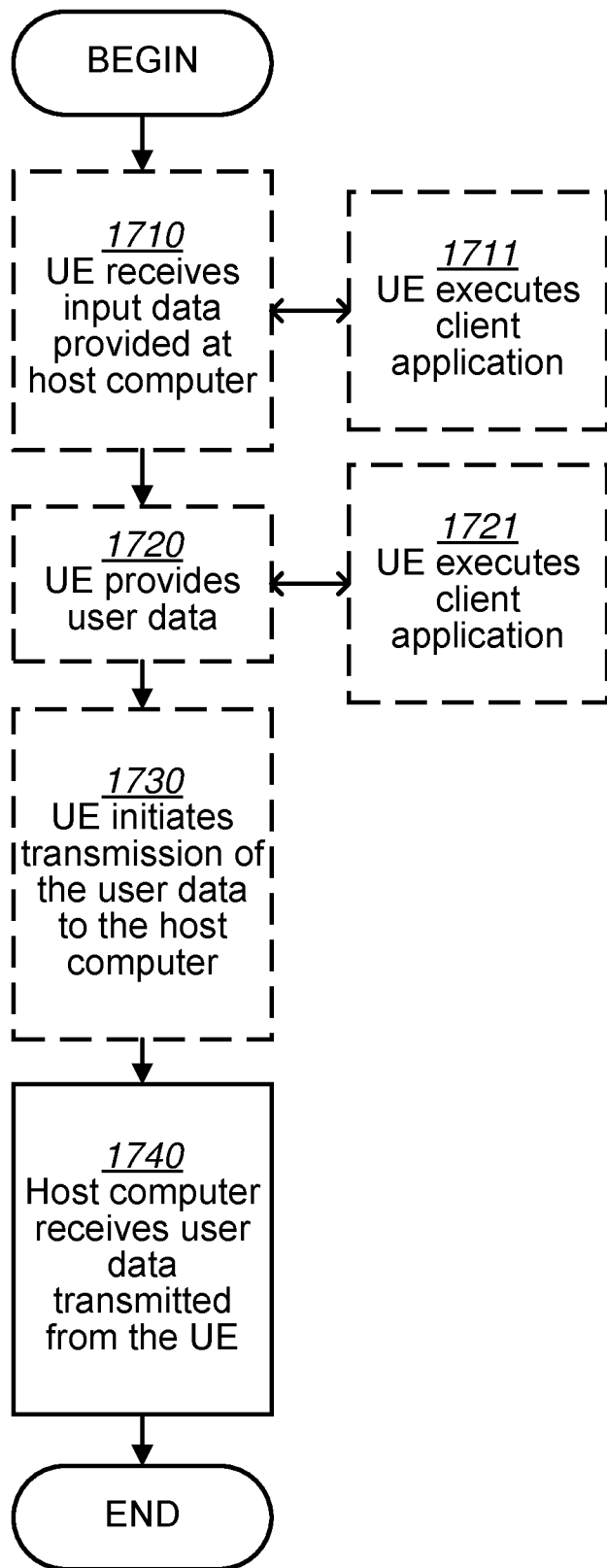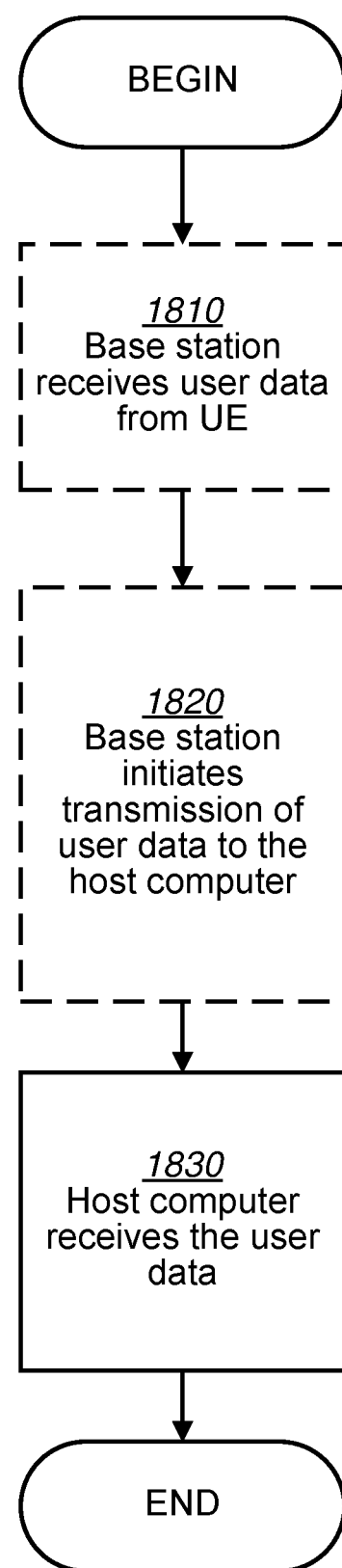
Fig. 17
Fig. 18

APPARATUSES AND METHODS FOR USING GROUP BUFFER STATUS REPORTS

PRIORITY

This nonprovisional application is a U.S. National Stage Filing under 35 U.S.C. § 371 of International Patent Application Serial No. PCT/SE2019/050882 filed Sep. 18, 2019 and entitled "APPARATUSES AND METHODS FOR USING GROUP BUFFER STATUS REPORTS" which is hereby incorporated by reference in its entirety.

TECHNICAL FIELD

The present disclosure generally relates to telecommunications. In particular, the various embodiments described in this disclosure relate to apparatuses and methods for using group Buffer Status Reports (BSRs) for group transmissions to a Base Station (BS) in a wireless communications system.

BACKGROUND

This section is intended to provide a background to the various embodiments of the invention that are described in this disclosure. Therefore, unless otherwise indicated herein, what is described in this section should not be interpreted to be prior art by its mere inclusion in this section.

Device-to-Device (D2D) communication in cellular networks is defined as direct communication between two devices, e.g. User Equipment (UEs), without traversing a Base Station (BS) or Core Network (CN). Proximity-based Services (ProSe) is a D2D technology that allows LTE UEs to detect each other and to communicate directly. A ProSe communicating UE may operate in two modes for resource allocation: scheduled resource allocation, mode 1, and UE autonomous resource selection, mode 2.

For scheduled resource allocation, mode 1, the UE requests transmission resources from the BS, i.e. the eNB, and the eNB schedules transmission resources for transmission of D2D control and data. The UE needs to be connected to a network to transmit data in this mode. For UE autonomous resource selection, mode 2, the UE selects resources on its own from resource pools to transmit D2D control and data.

If a UE is out of coverage, it may only use autonomous resource selection, as there is no way for the UE to send Scheduling Requests (SR) and Buffer Status Report (BSR) to the eNB and thereby obtain a grant for a scheduled resource. If the UE is in coverage, it may use scheduled resource allocation or autonomous resource selection as per eNB configuration. When an exceptional case occurs, the UE may be allowed to use UE autonomous resource selection temporarily even though it was configured to use scheduled resource allocation. Idle UEs can only use autonomous resource selection.

In general, it is more resource efficient to use scheduled transmissions because they are tailored for the amount of data available at the UE. Autonomous transmissions are beneficial in the sense that they do not require SR and BSR reporting and can be used also by idle or inactive UEs. However, autonomous transmissions waste resources because they occupy resources even when they are not used.

From a transmitter perspective, a ProSe communication UE may follow the procedure for mode 1 communication as shown in FIG. 1a. In a first step 1, the UE sends a scheduling request, e.g. Random Access (RA), to the eNB. In step 2, the UE receives resource grant from the eNB. Both these steps are the same as in legacy LTE procedure. Thereafter, in step 3, the UE sends a ProSe BSR requesting resource for ProSe communication and the UE receives resource grant for ProSe communication in step 4.

For mode 2 communication, the resource pools are provided by the system broadcast information and the UE may select the resources from the resource pool. The basic procedure is illustrated in FIG. 1a and 1b. FIG. 1b illustrates the procedure for the out-of-coverage case. In this case, the resource pool configuration is obtained from pre-configuration and the UE will select resource from the pre-configured resource pools and communicated with the other UEs.

3GPP TS 38.321, v.15.6.0, Section 5.4.4, describes SR used for requesting UpLink Shared CHannel (UL-SCH) resources for new transmission in New Radio (NR). A Medium Access Control (MAC) entity may be configured with zero, one, or more SR configurations. An SR configuration consists of a set of Physical Uplink Control CHannel (PUCCH) resources for SR transmission across different BandWidth Parts (BWPs) and cells. For a logical channel, at most one PUCCH resource for SR is configured per BWP.

Each SR configuration corresponds to one or more logical channels. Each logical channel may be mapped to zero or one SR configuration, which is configured by Radio Resource Control (RRC). As further described in TS 38.321, v.15.6.0, Section 5.4.5, the SR configuration of the Logical CHannel (LCH) that triggers the BSR, if such a configuration exists, is considered as corresponding SR configuration for the triggered BSR. For BSR triggered by retxBSR-Timer expiry, i.e. if no indication of a grant is received, the corresponding SR configuration for the triggered SR is that of the highest priority LCH (if such a configuration exists) that has data available for transmission at the time the BSR is triggered. FIG. 2 illustrates a typical scheduling procedure. In an unlicensed spectrum scenario, the UE or the gNB has to perform a channel sensing or LBT prior to any transmission in this procedure. In step 11, the UE has data to be transmitted. This triggers BSR and SR to the gNB to indicate that the UE has data to transmit (SR) and the amount of data (BSR). In step 12, a SR is transmitted to the gNB. The gNB typically responds with a small grant to let the UE provide the BSR, as illustrated in step 13. In step 14, the BSR is transmitted from the UE to the gNB, and in step 15, the gNB may respond with a second grant for the rest of the data.

The BSR may be transmitted using different formats. In NR, the formats illustrated in FIGS. 3a and 3b are available, as also described in TS 38.321, v15.6.0, Section 6.1.3.

FIG. 3a illustrates a short BSR and short truncated BSR MAC Control Element (CE). In the short BSR, the logical channel group (LCG), for which the buffer status is reported, is given by the LCG ID field. FIG. 3b illustrates a long BSR and long truncated BSR MAC CE. In the Long BSR, a bitmap in the first octet of the BSR indicates which of the configured LCGs the reported buffer sizes refer to.

For LTE MAC, the BSR formats are specified in TS 36.321, Section 6.1.3. The BSR MAC CE control element may be of a short BSR and truncated BSR format with one LCG ID field and one corresponding buffer size field. This format corresponds to the format illustrated in FIG. 3a. Alternatively, the BSR MAC CE control element may be of a long BSR format with four buffer size fields corresponding to LCG IDs #0 through #3. The long BSR format is illustrated in FIG. 3c.

The BSR formats are identified by MAC Protocol Data Unit (PDU) subheaders with Logical Channel IDs (LCID). The Logical Channel Group ID field identifies the group of logical channel(s) which buffer status is being reported. The length of the field is 2 bits. For Narrow Band Internet of Things (NB-IoT), the LCG ID is set to #0. The buffer size field identifies the total amount of data available across all logical channels of a logical channel group after all MAC PDUs for the Time Transmission Interval (TTI) have been built. The amount of data is indicated in number of bytes. It includes all data that is available for transmission in the Radio Link Control (RLC) layer and in the Packet Data Convergence Protocol (PDCP) layer. The size of the RLC and MAC headers are not considered in the buffer size computation. The length of this field is 6 bits.

Side Link (SL) BSR and Truncated SL BSR MAC CEs are illustrated in FIGS. 3d and 3e. FIG. 3d illustrates the SL BSR and truncated sidelink BSR MAC CE for even N. FIG. 3e illustrates the SL BSR and truncated SL BSR MAC CE for odd N. The SL BSR and Truncated SL BSR MAC CEs consist of one Destination Index field, one LCG ID field and one corresponding buffer size field per reported target group. The SL BSR MAC CEs are identified by MAC PDU subheaders. They have variable sizes.

The destination index field identifies the ProSe destination or the destination for Vehicle-to-everything (V2X) sidelink communication. The length of this field is 4 bits. The value is set to the index of the destination reported for SL communication or is set to one index among index(es) associated to same destination reported for V2X sidelink communication. If this is reported multiple times, the value is indexed sequentially across all the reports in the same order.

The LCG ID field identifies the group of logical channel(s) which buffer status is being reported. The length of the field is 2 bits. The buffer size field identifies the total amount of data available across all logical channels of an LCG of a ProSe Destination after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits. Buffer sizes of LCGs are included in decreasing order of the highest priority of the sidelink logical channel belonging to the LCG irrespective of the value of the Destination Index field. The field indicated with an R is a reserved bit, which is set to "0".

SUMMARY

By using Device-to-Device (D2D) group communication, uplink coverage and user bit rate may be increased, for example in a high frequency 5G, or New Radio (NR), network. On a high level, a group of User Equipment (UEs), or sensors, may be D2D capable. When a UE has data to transmit, it may first distribute this data to neighbouring UEs in the group over the D2D or SideLink (SL). In a second step, the UEs in the group may cooperatively transmit the data over the cellular UL. The cooperative transmission may increase the UL coverage e.g. by combining several UEs total output power and may be beneficial from a latency point of view compared to repeated transmissions for coverage, as used e.g. in LTE narrowband.

The 2-hop group transmission concept, i.e. where data first is transmitted over SL to the group and thereafter cooperatively transmitted over the cellular UL, is illustrated in FIGS. 4a and 4b. FIGS. 4a and 4b show a UE in a group that wants to transmit data through the group. FIG. 4a illustrates the first step, i.e. the $1^{st}$ hop, where the UE sends its data over the SL to the other UEs in the group. FIG. 4b illustrates the second step, i.e. the 2nd hop, where the data is sent in a synchronized manner from the UEs in the group over the cellular UL to a network node, e.g. an eNB or a gNB.

In DL, the network may transmit data to the group as if the group was a single UE. At least one UE in the group must be able to receive the DL data, and if necessary, the DL data may be relayed to the other UEs in the group via D2D. This technique is also known as cooperative relaying or Virtual Antenna Array.

However, the existing Proximity-based Services (ProSe) concept, i.e. LTE Device-to-Device (D2D), has some limitations. It cannot support 2-hop group, cooperative, transmission because it is not possible to perform scheduling of the 2-hop group transmission. If a UE in a group wants to be scheduled for a group transmission to a Base Station (BS), e.g. a gNB, the UE has to indicate this to the BS. This is not possible with the current standard. Additionally, if multiple UEs in the group have data for transmission via the group, a SR/BSR has to be sent for each UE in the group. This may cause high signalling overhead on the cellular link when each UE sends BSR. Especially, for small and bursty data traffic where using individual BSR would give excessive overhead. Furthermore, there may also be scheduling latency for the UE, because it has to wait to be schedule until the other UEs have been scheduled by the BS. Accordingly, there is a need for enhanced BSR reports in case there are multiple UEs with data available for group transmission, which would reduce BSR overhead and latency.

It is in view of the above background and other considerations that the various embodiments of the present disclosure have been made.

It is proposed to provide a solution to address this problem, i.e. providing a way of using group BSRs for group transmissions from a group of UEs to a BS, which reduce signaling overhead and latency.

This general object has been addressed by the appended independent claims. Advantageous embodiments are defined in the appended dependent claims.

According to a first aspect, there is provided a method, in a first UE, for transmitting group BSRs for group transmissions to a BS in a wireless communications system. The wireless communications system comprises the BS and a plurality of UEs including the first UE. The plurality of UEs are assigned to a group, wherein at least one of the UEs within the assigned group has data for group transmission to the BS.

The method comprises transmitting, to the BS, a group BSR. The group BSR comprises at least one identifier. The at least one identifier identifies a request for SL transmissions within the assigned group and a request for cooperative UL group transmissions of data, by the UEs within the assigned group, to the BS once the SL transmissions to the UEs within the assigned group are completed.

In some embodiments, the group BSR comprises a first identifier identifying the request for SL transmissions within the assigned group and a second identifier identifying the request for cooperative UL group transmissions of data by the UEs within the assigned group to the BS once the SL transmissions to the UEs within the assigned group are completed.

In some embodiments, the group BSR further comprises a third identifier identifying the assigned group comprising the plurality of UEs.

In some embodiments, the method further comprises the step of receiving, from the BS, grants for the SL and/or UL transmissions.

In some embodiments, the method further comprises receiving, from at least one second UE within the assigned group, at least one initial BSR to be transmitted to the BS and converting the received at least one initial BSR into the group BSR. The group BSR may comprise a fourth identifier identifying that the first UE has sent the group BSR on behalf of the at least one second UE.

In some embodiments, at least two initial BSRs are received from at least two second UEs within the assigned group. The step of converting the received at least two initial BSRs into the group BSR may then comprise aggregating the received at least two initial BSRs into the group BSR. The aggregated group BSR may comprise a fifth identifier identifying a number of UEs in the assigned group that have data for group transmissions and a sixth identifier identifying a total size of buffers for the number of UEs. Alternatively, the aggregated group BSR may comprise at least one seventh identifier identifying the total buffer size of each of the at least two second UEs.

In some embodiments, the BSR further comprises at least one eighth identifier identifying the at least one UE initiating the group transmission.

According to a second aspect, there is provided a method in a BS for receiving group BSRs from a first UE in a wireless communications system. The wireless communications system comprises the BS and a plurality of UEs including the first UE. The plurality of UEs are assigned to a group. At least one of the UEs within the assigned group has data for group transmission to the BS.

The method comprises receiving, from the first UE, a group BSR, wherein the group BSR comprises at least one identifier identifying a request for SL transmissions within the assigned group and a request for cooperative UL group transmissions by the UEs within the assigned group to the BS once the SL transmissions to the UEs within the assigned group are completed.

In some embodiments, the group BSR comprises first identifier identifying the request for SL transmissions within the assigned group and a second identifier identifying the request for cooperative UL group transmissions by the UEs within the assigned group to the BS once the SL transmissions to the UEs within the assigned group are completed.

In some embodiments, the group BSR further comprises a third identifier identifying the assigned group comprising the plurality of UEs.

In some embodiments, the group BSR comprises a fourth identifier identifying that the first UE has sent the group BSR on behalf of at least one second UE.

In some embodiments, the received group BSR comprises at least two initial BSRs aggregated into the group BSR. The at least two initial BSRs originates from at least two second UEs within the assigned group that have data for group transmissions. The aggregated group BSR may comprise a fifth identifier identifying a number of UEs in the assigned group that have data for group transmissions and a sixth identifier identifying a total size of buffers for the numbers of UEs. Additionally, the aggregated group BSR may comprise at least one seventh identifier identifying the total buffer size of each of the at least two second UEs with data for group transmissions within the assigned group.

In some embodiments, the group BSR further comprises at least one eighth identifier identifying the at least one UE initiating the group transmission.

In some embodiments, the method further comprises transmitting, to the first UE, grants for the SL and/or UL transmissions.

According to a third aspect, there is provided a first UE configured to perform the method according to the first aspect.

The first UE is configured for transmitting group BSRs for group transmissions to a BS in a wireless communication system. The wireless communication system comprises the BS and a plurality of UEs including the first UE. The plurality of UEs are assigned to a group. At least one of the UEs within the assigned group has data for group transmission to the BS. The first UE comprises a processing circuitry and a memory circuitry. The memory circuit stores computer program code which, when run in the processing circuitry, causes the first UE to transmit, to the BS, a group BSR. The group BSR comprises at least one identifier identifying a request for SL transmissions within the assigned group and a request for cooperative UL group transmission of data by the UEs within the assigned group to the BS once the SL transmissions to the UEs within the assigned group are completed.

In some embodiments, the group BSR comprises a first identifier identifying the request for SL transmissions within the assigned group and a second identifier identifying the request for cooperative UL group transmission of data by the UEs within the assigned group to the BS once the SL transmissions to the UEs within the assigned group are completed.

In some embodiments, the group BSR further comprises a third identifier identifying the assigned group comprising the plurality of UEs.

In some embodiments, the memory circuitry storing computer program code which, when run in the processing circuitry, further causes the first UE to receive, from the BS, grants for the SL and/or UL transmissions.

In some embodiments, the memory circuitry storing computer program code which, when run in the processing circuitry, further causes the first UE to receive, from at least one second UE within the group, at least one initial BSR to be transmitted to the BS. The first UE is further caused to convert the received at least one initial BSR into the group BSR. The group BSR may comprise a fourth identifier identifying that the first UE has sent the group BSR on behalf of the at least one second UE.

In some embodiments, at least two initial BSRs are received from at least two second UEs within the assigned group.

In some embodiments, the memory circuitry storing computer program code which, when run in the processing circuitry, further causes the first UE to aggregate the received at least two initial BSRs into the group BSR. The aggregated group BSR may comprise a fifth identifier identifying a number of UEs in the assigned group that have data for group transmissions and a sixth identifier identifying a total size of buffers for the number of UEs. Alternatively, the aggregated group BSR comprises at least one seventh identifier identifying the total buffer size of each of the at least two second UEs.

In some embodiments, the group BSR further comprises at least one eighth identifier identifying the at least one UE initiating the group transmission.

According to a fourth aspect, there is provided a BS configured to perform the method according to the second aspect.

The BS is configured for receiving group BSRs for group transmissions from a first UE in a wireless communication system. The wireless communication system comprises the BS and a plurality of UEs including the first UE. The plurality of UEs are assigned to a group. At least one of the UEs within the assigned group has data for group transmission to the BS. The BS comprises a processing circuitry and a memory circuitry. The memory circuit stores computer program code which, when run in the processing circuitry, causes the BS to receive, from a first UE, a group BSR. The group BSR comprises at least one identifier identifying a request for SL transmissions within the assigned group and a request for cooperative UL group transmissions, by the UEs within the assigned group, to the BS once the SL transmissions to the UEs within the assigned group are completed.

In some embodiments, the BSR further comprises a first identifier identifying the request for SL transmissions within the assigned group and a second identifier identifying the request for cooperative UL group transmissions by the UEs within the assigned group to the BS.

In some embodiments, the group BSR further comprises a third identifier identifying the assigned group comprising the plurality of UEs.

In some embodiments, the group BSR comprises a fourth identifier identifying that the first UE has sent the group BSR on behalf of at least one second UE.

In some embodiments, the received group BSR comprises at least two initial BSRs aggregated into the group BSR. The at least two initial BSRs originates from at least two second UEs with data for group transmissions within the assigned group. The aggregated group BSR may comprise a fifth identifier identifying a number of UEs in the assigned group that have data for group transmission and a sixth identifier identifying a total size of buffers for the numbers of UEs. Alternatively, the aggregated group BSR may comprise at least one seventh identifier identifying the total buffer size of each of the at least two second UEs with data for group transmission within the assigned group.

In some embodiments, the group BSR further comprises at least one eighth identifier identifying the at least one UE initiating the group transmission.

In some embodiments, the memory circuitry storing computer program code which, when run in the processing circuitry, further causes the BS to transmit, to the UE, grants for the SL and/or UL transmissions.

According to a fifth aspect, there is provided a computer program, comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

The various proposed embodiments herein provide a solution for using group BSRs for group transmissions to a BS in a way that reduces signaling overhead and latency.

BRIEF DESCRIPTION OF THE DRAWINGS

These and other aspects, features and advantages will be apparent and elucidated from the following description of various embodiments, reference being made to the accompanying drawings, wherein:

FIGS. 17 and 18 show example methods implemented in a communication system including a host computer, a base station and a user equipment.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art. Like reference numbers refer to like elements throughout the description.

In one of its aspects, the disclosure presented herein concerns a method in a first User Equipment (UE) for transmitting group Buffer Status Reports (BSRs) for group transmissions to a Base Station (BS) in a wireless communication system.

Figure 5A:
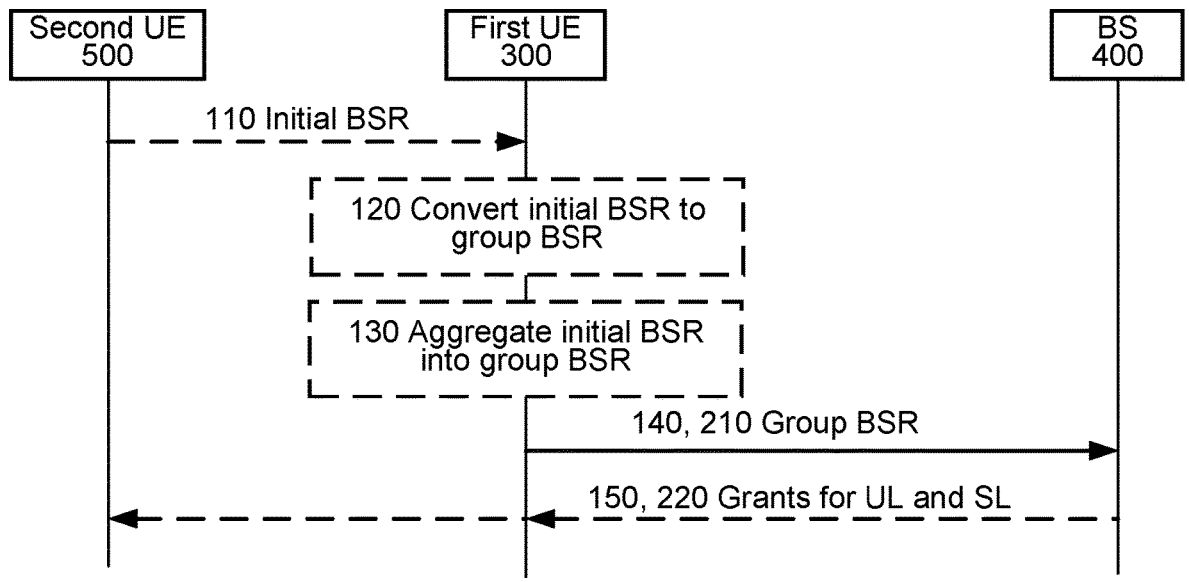
FIG. 5a is a message sequence chart of a process for using group BSRs in a wireless communications system.
Figure 6:
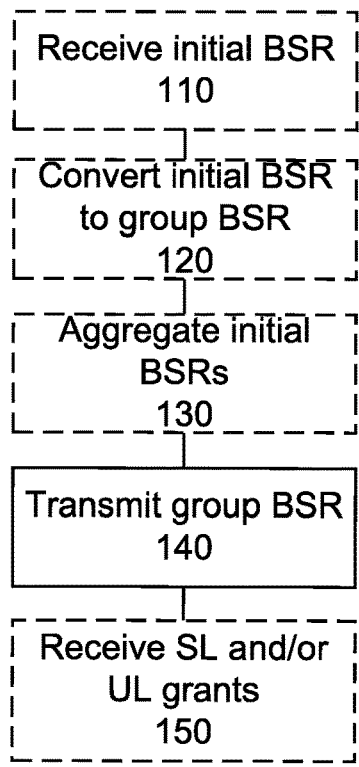
FIG. 6 is a flowchart of an example method performed by a first UE.

With reference to the FIGS. 5a and 6, a first embodiment will now be described. FIG. 5a illustrates a message sequence chart of a process for using group BSRs for group transmissions to a BS in a wireless communication system. FIG. 6 illustrates a method 100 in a first UE 300, for transmitting group BSRs for group transmissions in a wireless communications system. The wireless communications system comprises the BS 400 and a plurality of UEs, including the first UE 300. The plurality of UEs are assigned to a group. At least one of the UEs within the assigned group has data for group transmission to the BS 400.

The method 100 comprises step 140 of transmitting, to the BS, a group BSR. The group BSR comprises at least one identifier identifying a request for SideLink (SL) transmissions within the assigned group and a request for cooperative UpLink (UL) group transmissions of data by the UEs within the assigned group to the BS 400 once the SL transmissions to the UEs within the assigned group are completed. Accordingly, the proposed group BSR comprises at least one identifier that indicates if a SL transmission to the entire group is wanted. The at least one identifier may further indicate if a cooperative UL transmission of the data, once the SL transmission is completed, is wanted.

Figure 1A:
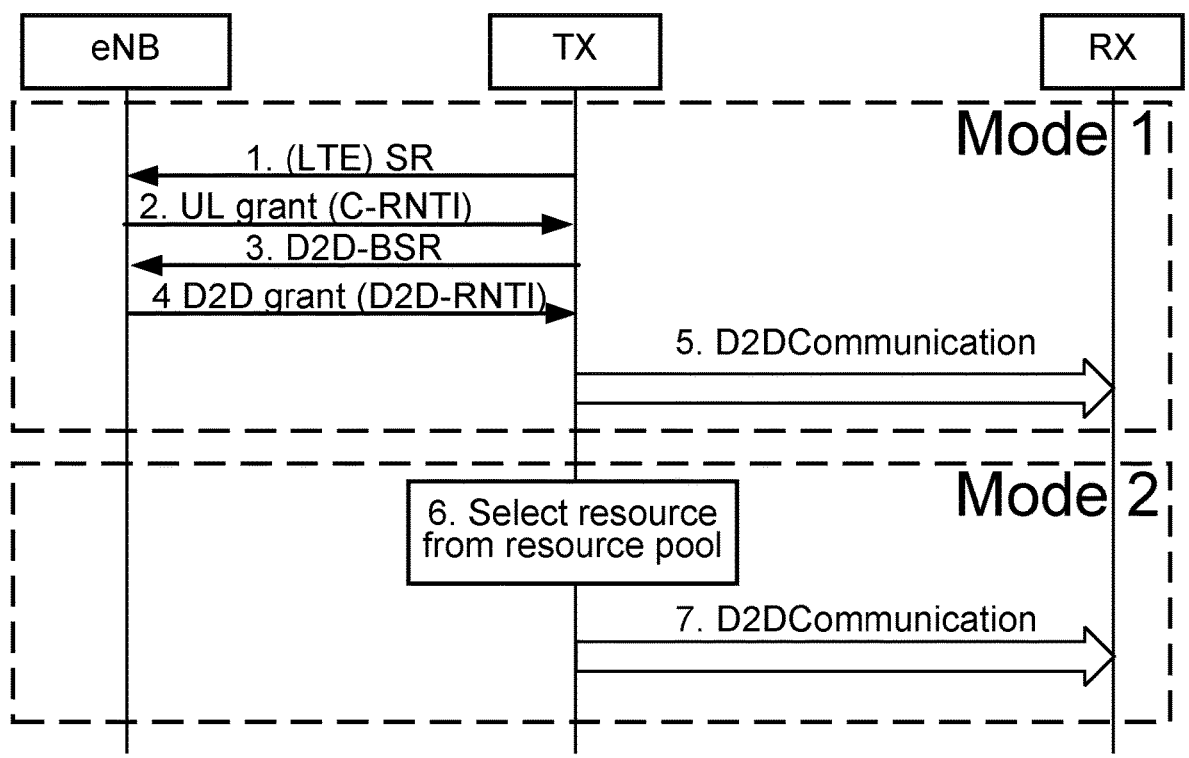
FIG. 1a illustrates a communication procedure for D2D TX in-coverage.
Figure 1B:
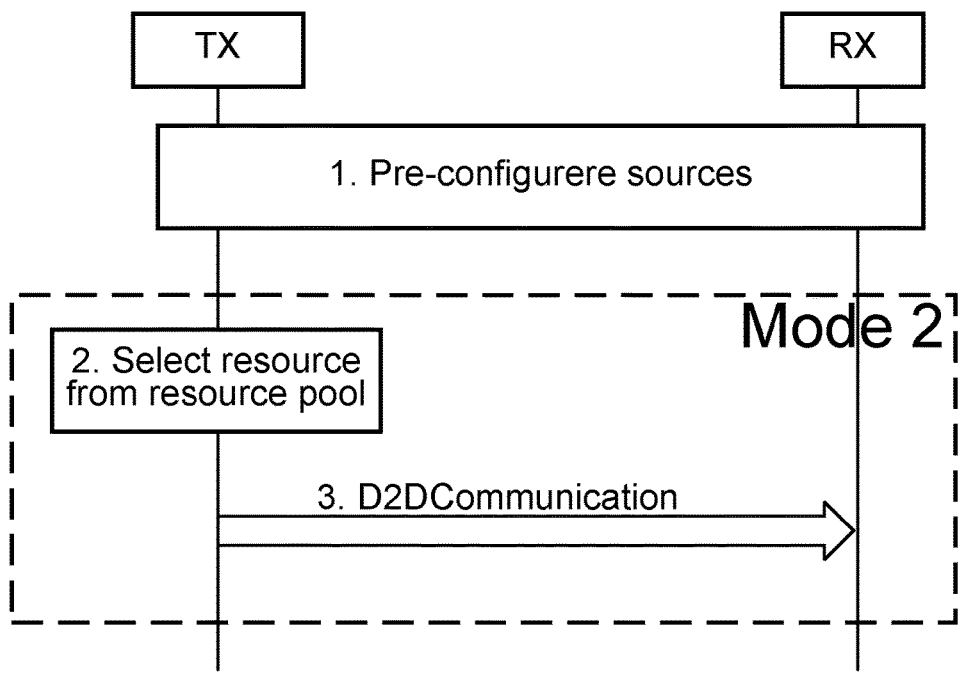
FIG. 1b illustrates a communication procedure for D2D TX out-of-coverage.
Figure 2:
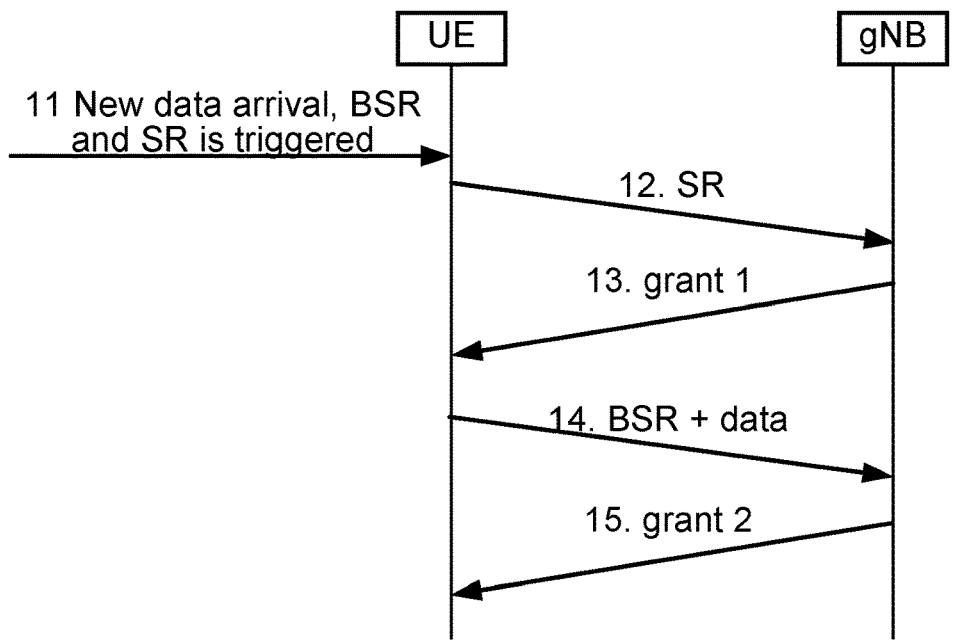
FIG. 2 illustrates a dynamic scheduling procedure.
Figure 3A:
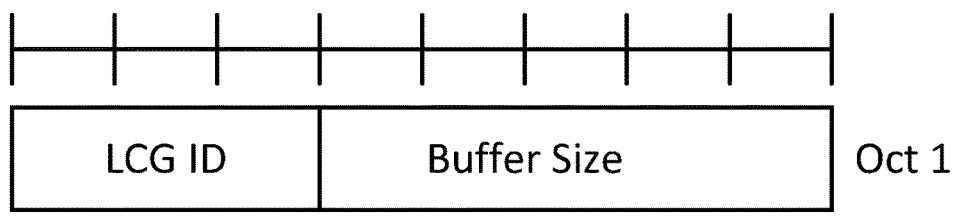
FIG. 3a, b, c, d, e illustrate different BSR formats.
Figure 3B:
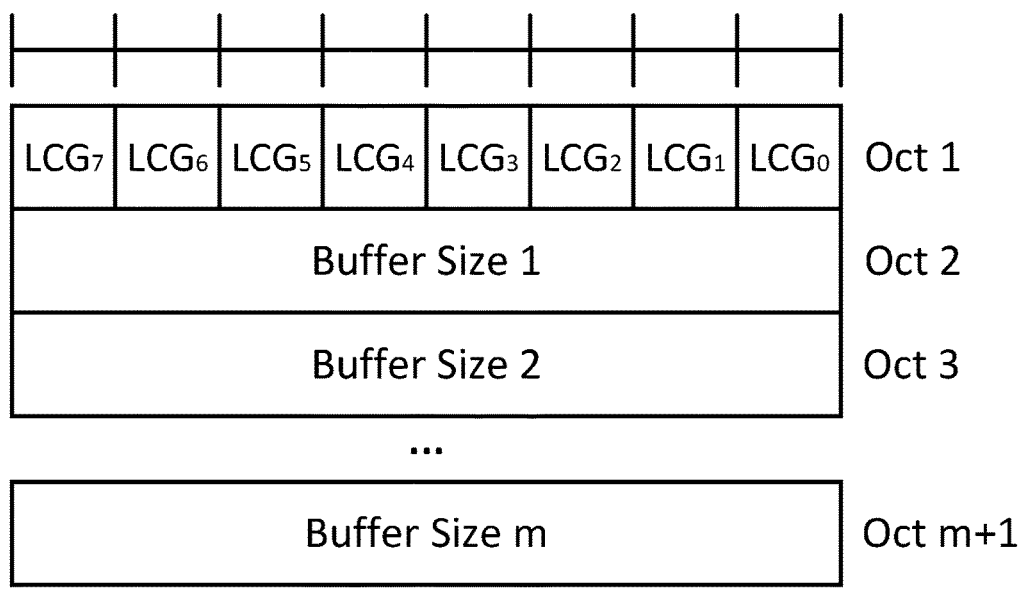
Figure 3C:
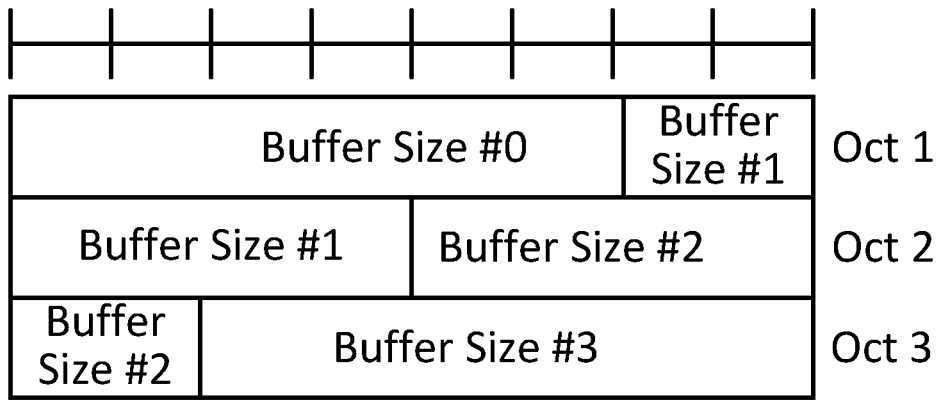
Figure 3D:
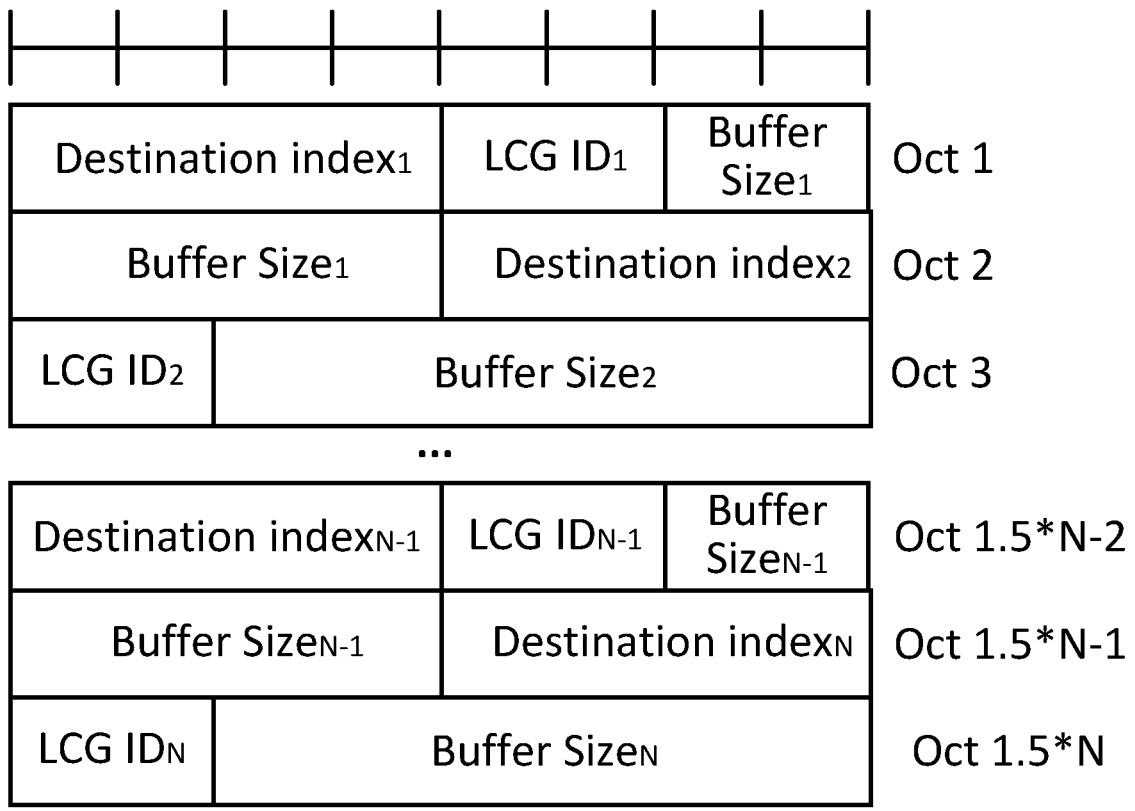
Figure 3E:
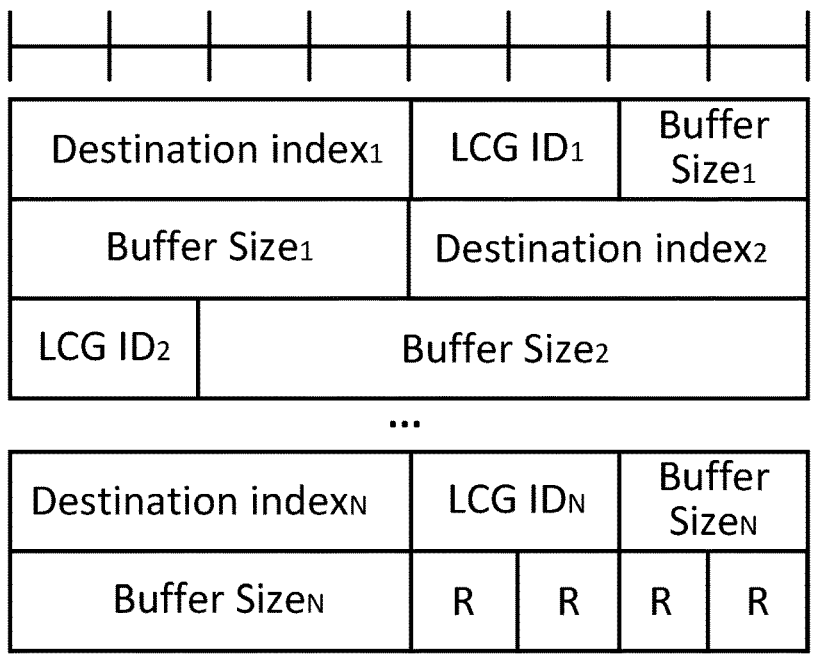
Figure 4A:
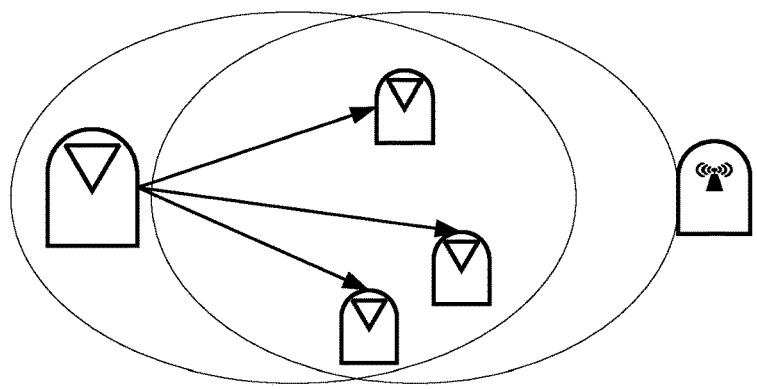
FIGS. 4a and 4b show schematic figures of 2-hop group communication.
Figure 4B:
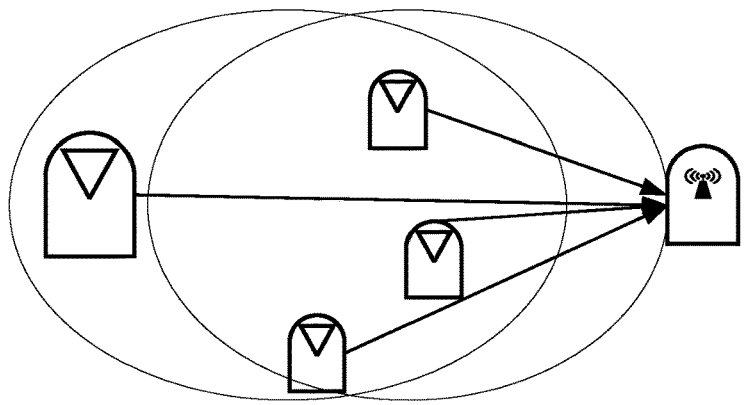
Figure 5B:
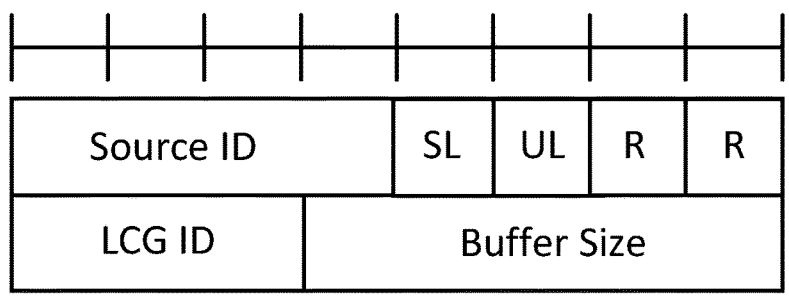
FIGS. 5b, c, d, e, f, g, h show different group BSR formats.

Accordingly, the group BSR according to the present disclosure has a new format compared to SL/D2D BSR formats, described with reference to FIGS. 3*d* and 3*e*, or the normal New Radio (NR), or 5G, formats, described with reference to FIGS. 3*ad* and 3*b*, or Long Term Evolution (LTE), or 4G, formats, described with reference to FIGS. 3*a* and 3*c*. FIG. 5*b* illustrates an example of the proposed BSR format. The example is a short BSR to indicate buffer status for SL and UL transmission. The new BSR format, used for group transmissions, indicates that a UE has data to send in UL and also that it may want to do a sidelink transmission of the same data to the whole group to enable a cooperative UL transmission to the BS 400.

Thus, the proposed method 100 provides a solution for transmitting group BSRs to a BS 400, which indicates to the BS 400 that a UE, within the group of UEs, wants to be scheduled for a group transmission to the BS 400. The proposed method 100 provides a solution for scheduling, and more specifically for reporting BSRs, for a 2-hop sidelink group transmission.

In some embodiments, the group BSR may comprise a first identifier, or indicator. The first identifier identifies the request for SL transmissions within the assigned group. The group BSR may further comprise a second identifier, or indicator. The second identifier identifies the request for cooperative UL group transmissions to the BS 400. Accordingly, by using two identifiers, one for each request, it may be possible to, for example, request SL transmission, but not cooperative UL group transmissions, or to request cooperative UL group transmissions, but not SL transmissions within the assigned group. The two identifiers may also indicate both a request for SL transmissions and for cooperative UL group transmissions. The first identifier is, for example, illustrated in FIG. 5*b* with the field named SL. The second identifier is, for example, illustrated in FIG. 5*b* with the field named UL.

Figure 5C:
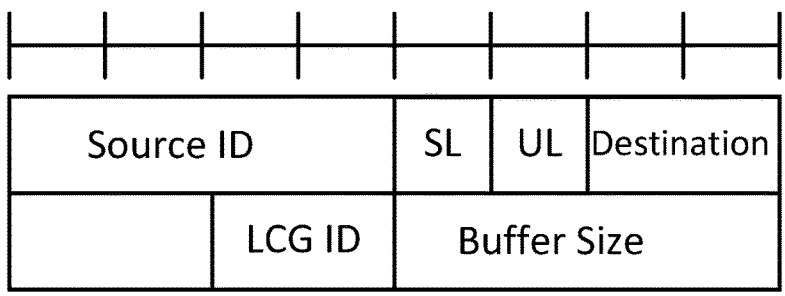

In some embodiments, the group BSR may further comprise a third identifier, or indicator. The third identifier identifies the assigned group comprising the plurality of UEs. Accordingly, the third identifier may identify the receiving group for the SL transmission. This may be relevant in case this cannot be derived by the UEs in the group. FIG. 5*c* illustrates an example of such a group BSR format. The field named Destination illustrates the third identifier. The example in FIG. 5*c* shows a short BSR, with group destination, i.e. the third identifier, to indicate buffer status for SL and UL transmissions. The third identifier may, for example, be used to indicate the group that the SL transmission and the cooperative UL transmission may serve for. This field may be absent if there is only one group configured in the cell. Otherwise, if there are multiple groups configured in the cell, the field may be present. The destination field may, for example, indicate if the destination group is a subgroup of the assigned group, i.e. that not all UEs within the assigned group should receive the data transmitted by SL. It is worth noting that the size of this field may depend on the maximum number of groups that may be configured in the cell. With 4 bits in the field, up to 16 groups may be configured in the cell.

Figure 5D:
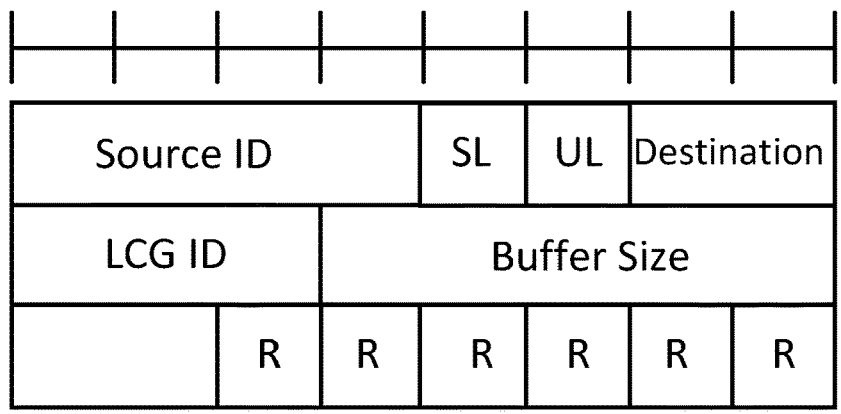

In case LTE is used as baseline, the LTE group BSR formats used may be appended to the first byte in the example illustrated in FIG. 5*b*. If the group BSR may comprise the third identifier, the LTE group BSR formats may be appended to a two byte header similar to what is illustrated in FIG. 5*d*. FIG. 5*d* shows an example of first two bytes when LTE BSR may be used as baseline. It may be noted that the illustrated Medium Access Control (MAC) BSR Control Elements (CEs) may require new Logical Channel IDs (LCID) numbers to be defined accordingly. The new LCID numbers may be used in the MAC subheader to represent these new MAC BSR CEs.

Figure 5E:
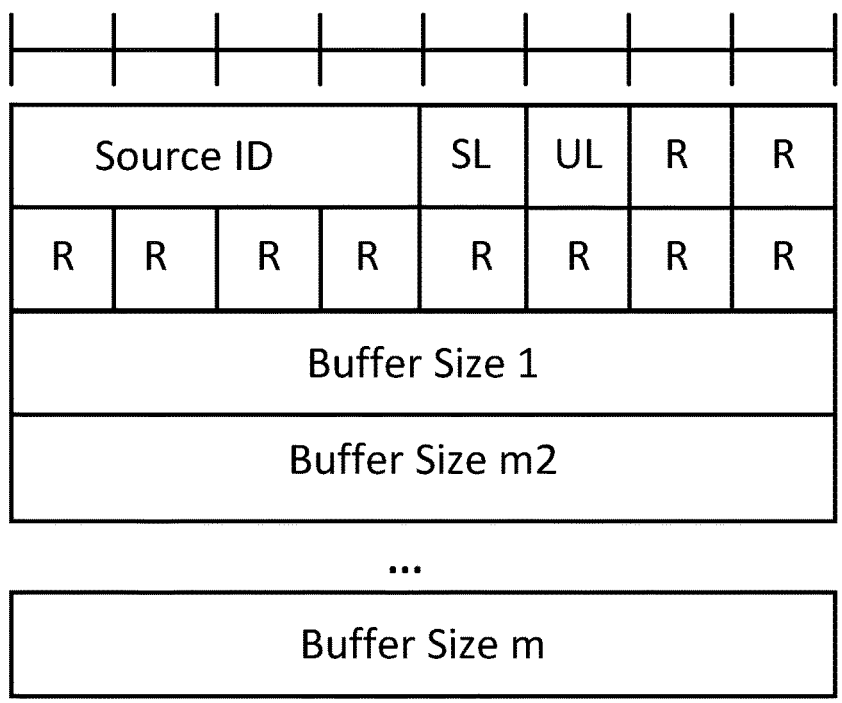

FIG. 5*e* shows an example of a long group BSR to indicate buffer status for SL and UL transmission. The fields in the first byte of the group BSR may be the same as for the short group BSR without the destination index illustrated in FIG. 5*b*. In case the third identifier is used, the first byte in FIG. 5*e* may be replaced by the header in FIG. 5*d*.

As also illustrated in FIG. 5*a*, in some embodiments, the method 100 may further comprise the step 150 of receiving, from the BS 400, grants for the SL and/or UL transmissions. Accordingly, the UEs may be scheduled to transmit the data in the group transmissions. In one embodiment, only grants for SL transmissions are received. In another embodiment, only grants for UL transmissions are received. In still another embodiment, grants for both SL and UL transmissions are received.

The proposed method 100 may also be applicable for a multiple-hop scenario where a packet may be transmitted by an originating UE, i.e. a source UE, over a link comprising multiple hops and eventually reach the serving BS 400. Prior to the transmission, the BS may schedule resources for all hops. In this case, the source UE may send a group BSR to the BS 400 for requesting resources for all hops. In such embodiment, a hop index may be included in the BSR MAC CE. If there are N hops for a link, the BSR MAC CE may then carry N indices for all N hops. Alternatively, a bitmap may be used to represent presence or absence of all hops.

In some embodiments, the method 100 may start at step 110 with receiving, from at least one second UE 500 within the assigned group, at least one initial BSR to be transmitted to the BS 400. Thus, the first UE 300 receives an initial BSR from one of the UEs within the assigned group, which group also the first UE 300 is assigned to. The at least one second UE 500 within the assigned group accordingly has data that it wants to transmit in a cooperative group transmission to the BS 400. The method 100 may then continue to step 120 of converting the received at least one initial BSR into a group BSR. Converting the received at least one initial BSR into a group BSR, according to some embodiments, means creating a group BSR based on the received at least one initial BSR.

Figure 5F:
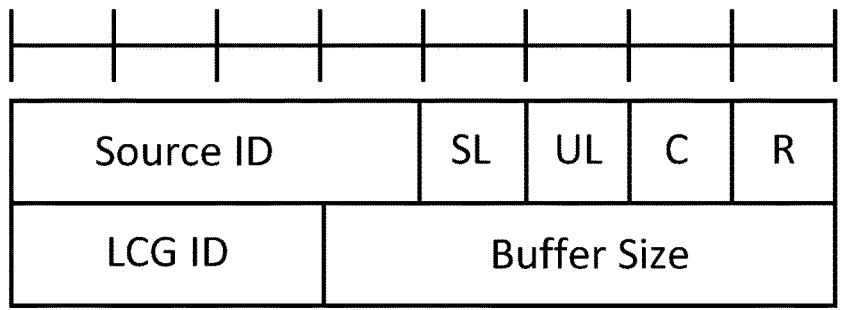

Thus, the proposed method 100 provides a solution for scheduling, or more specifically transmitting BSRs, for a 2-hop sidelink group transmission, also when a UE within an assigned group is out of coverage. In such scenario, the UE, here the at least one second UE 500, may transmit an initial BSR, which the first UE 300 may convert to a group BSR and forward to the BS 400. In the scenario, the first UE 300 is the group coordinator for the group of UEs. The at least one second UE 500 may use configured grants over the SL to transmit the initial BSR to the first UE 300, i.e. the group coordinator. When the first UE 300 receives the initial BSR, it may trigger an UL transmission of the BSR to the BS 400. When the BS 400 identifies that a received BSR is transmitted via the coordinator, i.e. the first UE 300, it may send grants for SL or UL transmissions, or both SL and UL transmissions, to the coordinator, i.e. the first UE 300. The first UE 300 may then use SL transmissions to forward the grants for SL and/or UL transmissions to the plurality of UEs assigned to the group. The BS 400 have to ensure that there is enough time between the SL and UL grant. To enable for the BS 400 to identify that the group BSR is transmitted by the coordinator on behalf of a source UE 500, the group BSR may comprise a fourth identifier, or indicator. The fourth identifier identifies that the first UE 300 has sent the group BSR on behalf of the at least one second UE 500. This is illustrated in FIG. 5f, where the field C is used in the short BSR format to indicate that the coordinator has sent the group BSR on behalf of the source UE 300.

In some embodiments, at least two initial BSRs may be received from at least two second UEs 500 within the assigned group. Accordingly, multiple UEs within the assigned group may have data to be transmitted in group transmissions. The first UE 300 may then receive initial BSRs from all these UEs. In such embodiments, the step 120 of converting the received at least two initial BSRs into the group BSR may comprise the step 130 of aggregating the received at least two initial BSRs into the group BSR. Thus, the first UE 300 may aggregate the initial BSRs, received from different source UEs, into a single group BSR, which is going to be sent to the BS by the coordination, i.e. the first UE 300. The received initial BSRs from the at least two second UEs 500 may be queued in the first UE 300 within a configured time interval and then transmitted together to the BS 400 as an aggregated group BSR. The received initial BSRs may thus be aggregated into one message or MAC CE.

Figure 5G:
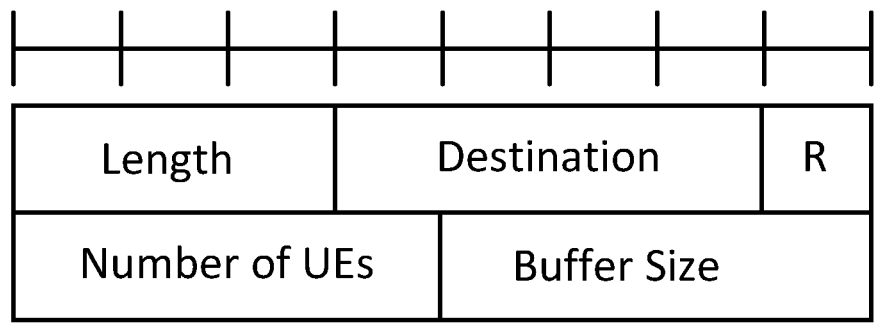
Figure 5H:
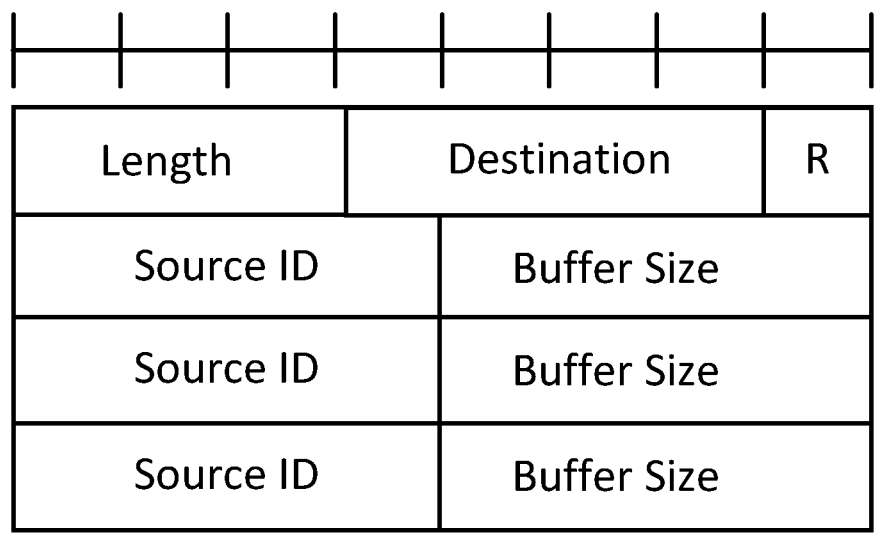

The initial BSRs may be done by simple concatenation of the BSRs illustrated in e.g. FIG. 5b, 5c or 5e. Alternatively, the aggregated group BSR may comprise a fifth identifier, or indicator, and a sixth identifier, or indicator. The fifth identifier identifies a number of UEs in the assigned group that have data for group transmissions. The sixth identifier identifies a total size of buffers for the number of UEs. An example of such group BSR format is illustrated in FIG. 5g. The total buffer size of all UEs and the number of UEs having pending data may be reported. This may give a very small size of the group BSR, which may be efficient in some cases. In another embodiment, the aggregated group BSR may comprise at least one seventh identifier, or indicator. The seventh identifier identifies the total buffer size of each of the at least two second UEs. In such embodiment, the aggregated group BSR may further comprise at least one eighth identifier, or indicator. The eight identifier identifies the at least one UE initiating the group transmission. An example of such format of the group BSR is illustrated in FIG. 5h. The total buffer size per UE may be reported similar to short BSRs, aggregated per UE. This may give the total buffer size per UE instead of the Logical Channel Group (LCG) with highest priority and may have a smaller size than if reporting long BSRs for all the UEs. Instead of the total buffer size per UE, the buffer size may report the total buffer size for Logical CHannels (LCHs) with a priority above some configured priority per UE.

With the formats illustrated in FIGS. 5g and 5h, it is assumed that all UEs in the group may transmit data from the same service. However, in case different service types are associated with different UEs, a service or application identifier may be included in the MAC CE. It should be noted that these new MAC CE BSRs may require that new LCID numbers are reserved.

Accordingly, the present disclosure provides a new BSR format. The new BSR format makes it possible to schedule a group transmission to a BS using a 2-hop sidelink group transmission. The present disclosure further makes it possible to aggregate BSRs received from several UEs within a group to a group BSR. By using a group BSR instead of several separate BSRs for group transmission, signalling overhead and latency may be reduced.

According to a second aspect, there is provided a method in a BS 400, for receiving group BSRs for group transmissions from a first UE 300 in a wireless communication system.

Figure 7:
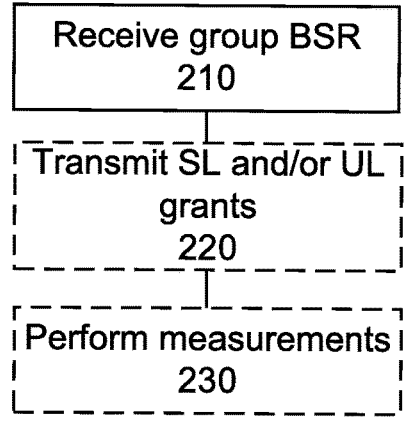
FIG. 7 is a flowchart of an example method performed by a BS.

With reference to the FIGS. 5a and 7, a first embodiment will now be described. As stated above, FIG. 5a illustrates a message sequence chart of a process for using group BSRs for group transmissions to a BS 400 in a wireless communication system. FIG. 7 illustrates a method 200 in a BS 400 for receiving group BSRs for group transmissions from a first UE 300 in a wireless communication system. The wireless communications system comprises the BS 400 and a plurality of UEs 500 including the first UE 300. The plurality of UEs being assigned to a group. At least one of the UEs within the assigned group has data for group transmission to the BS 400.

The method 200 starts at step 210 with receiving, from the first UE 300, a group BSR. The group BSR comprises at least one identifier identifying a request for SL transmissions within the assigned group and a request for cooperative UL group transmissions of data by the UEs within the assigned group to the BS 400 once the SL transmissions to the UEs within the assigned group are completed. FIGS. 5b to 5h illustrate examples of such group BSR formats.

According to the proposed method 200, a new BSR format may be used for group transmissions. The new BSR, i.e. the group BSR, may indicate that a UE has data to send in UL and that it also wants to do a sidelink transmission of the same data to the whole group to enable a cooperative UL transmission to the BS 400. Thus, the proposed method 200 provides a solution for receiving group BSRs from a plurality of UEs, which indicate to the BS 400 that a UE, within the group of UEs, wants to be scheduled for a group transmission to the BS 400. The proposed method 200 provides a solution for scheduling, and more specifically for reporting BSRs, for a 2-hop sidelink group transmission.

In some embodiments, the group BSR may comprise a first identifier identifying the request for SL transmissions within the assigned group. The group BSR may further comprise a second identifier identifying the request for cooperative UL group transmissions by the UEs within the assigned group to the BS 400. One example of such BSR format is illustrated in FIG. 5b, where the field named SL illustrates the first identifier and the field named UL illustrates the second identifier.

In some embodiments, the group BSR may further comprise a third identifier identifying the assigned group comprising the plurality of UEs. This is shown in, for example, FIG. 5c where the field named Destination illustrates the third identifier.

In some embodiments, the group BSR may further comprise a fourth identifier identifying that the first UE 300 has sent the group BSR on behalf of at least one second UE 500. This is shown in, for example, FIG. 5f, where the field named C illustrates the fourth identifier.

In some embodiments, the received group BSR may comprise at least two initial BSRs aggregated into the group BSR, wherein the at least two initial BSRs originates from at least two second UEs 500 with data for group transmissions within the assigned group. The aggregated group BSR may, for example, comprise a fifth identifier identifying a number of UEs in the assigned group that have data for group transmissions and a sixth identifier identifying a total size of buffers for the numbers of UEs. This is illustrated in FIG. 5g, where the field named Number of UEs illustrates the fifth identifier and the field named Buffer Size illustrates the sixth identifier. Alternatively, the aggregated group BSR may comprise at least one seventh identifier identifying the total buffer size of each of the at least two second UEs 500 with data for group transmissions within the assigned group. This is illustrated in FIG. 5h, where the fields named Buffer Size illustrates the seventh identifiers.

In some embodiments, the group BSR may further comprise at least one eighth identifier identifying the at least one UE initiating the group transmission. This is an optional field but is illustrated in all the FIGS. 5b to 5h, where the field named Source ID illustrates the eighth identifier.

In some embodiments, the method 200 may further comprise the step 220 of transmitting, to the first UE 300, grants for the SL and/or UL transmissions.

According to a third aspect, there is provided a first UE 300 for performing the method 100 according to the first aspect.

Figure 8:
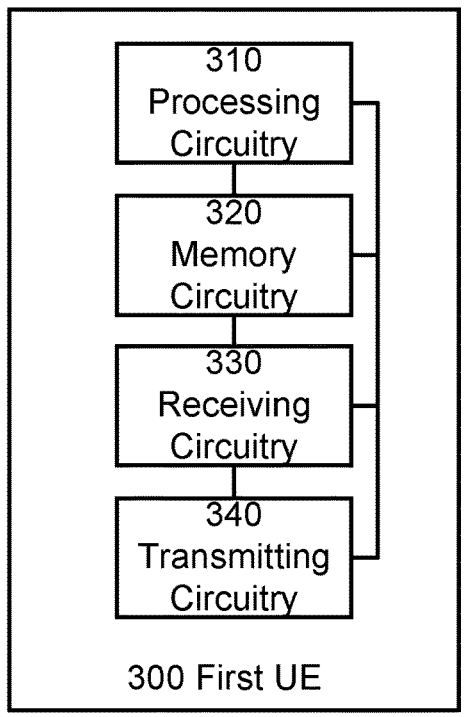
FIG. 8 shows an example implementation of a first UE.

The first UE 300 is now going to be described with reference to FIG. 8. The first UE 300 may be used in, but are not limited to, a wireless communication system. The wireless communication system comprises the BS 400 and a plurality of UEs including the first UE 300. The plurality of UEs being assigned to a group. At least one of the UEs within the assigned group has data for group transmission to the BS 400.

The first UE 300 is configured for transmitting group BSRs for group transmissions to the BS 400 in the wireless communication system. As illustrated in FIG. 8, the first UE 300 comprises a processor, or a processing circuitry 310, and a memory, or a memory circuitry 320.

Additionally, or alternatively, the first UE 300 may further comprise a transmitter, or a transmitting circuitry 340, configured to transmit data to other apparatuses, such as the BS 400.

Additionally, or alternatively, the first UE 300 may further comprise a receiver, or a receiving circuitry 330, configured to receive data from other apparatuses, such as the BS 400.

The memory circuitry 320 stores computer program code which, when run in the processing circuitry 310, causes the first UE 300 to transmit, to the BS 400, a group BSR. The group BSR comprises at least one identifier identifying a request for SL transmissions within the assigned group and a request for cooperative UL group transmissions of data by the UEs within the assigned group to the BS 400 once the SL transmissions to the UEs within the assigned group are completed.

In some embodiments, the group BSR may further comprise a first identifier identifying the request for SL transmissions within the assigned group. The group BSR may further comprise a second identifier identifying the request for cooperative UL group transmission of data by the UEs within the assigned group to the BS 400.

In some embodiments, the group BSR may further comprise a third identifier identifying the assigned group comprising the plurality of UEs.

In some embodiments, the memory circuitry 320 storing computer program code which, when run in the processing circuitry 310, may further cause the first UE 300 to receive, from the BS 400, grants for the SL and/or UL transmissions.

In some embodiments, the memory circuitry 320 storing computer program code which, when run in the processing circuitry 310, may further cause the first UE 300 to receive, from at least one second UE 500 within the group, at least one initial BSR to be transmitted to the BS 400. The first UE 300 may further be caused to convert the received at least one initial BSR into the group BSR.

In some embodiments, the group BSR may comprise a fourth identifier identifying that the first UE 300 has sent the group BSR on behalf of the at least one second UE 500.

In some embodiments, at least two initial BSRs may be received from at least two second UEs 500 within the assigned group. The memory circuitry 320 storing computer program code which, when run in the processing circuitry 310, may then further cause the first UE 300 to aggregate the received at least two initial BSRs into the group BSR. The aggregated group BSR may, for example, comprise a fifth identifier identifying a number of UEs in the assigned group that have data for group transmissions and a sixth identifier identifying a total size of buffers for the number of UEs. Alternatively, the aggregated group BSR may comprise at least one seventh identifier identifying the total buffer size of each of the at least two second UEs 500.

In some embodiments, the group BSR may further comprise at least one eighth identifier identifying the at least one UE initiating the group transmission.

According to a fourth aspect, there is provided a BS 400 for implementing the method according to the second aspect.

Figure 9:
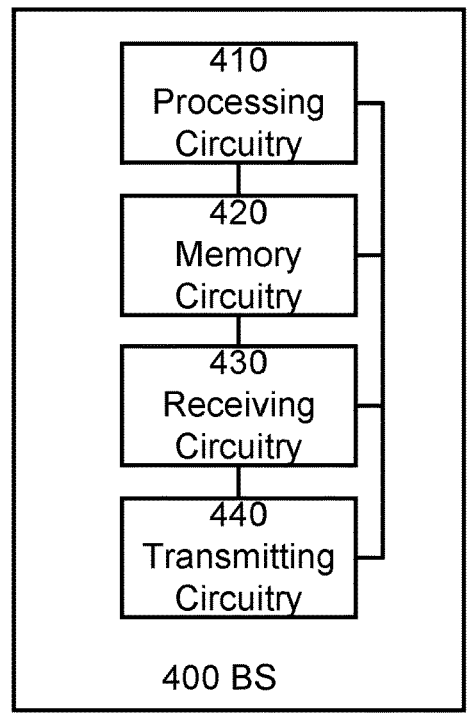
FIG. 9 shows an example implementation of a BS.

The BS 400 is now going to be described with reference to FIG. 9. The BS 400 may be used in, but are not limited to, wireless communications system. The wireless communication system comprises the BS 400 and a plurality of UEs including a first UE 300. The plurality of UEs are assigned to a group. At least one of the UEs within the assigned group has data for group transmission to the BS 400.

The BS 400 is configured for receiving group BSRs for group transmissions from the first UE in a wireless communication system. As illustrated in FIG. 9, the BS 400 comprises a processor, or a processing circuitry 410, and a memory, or a memory circuitry 420.

Additionally, or alternatively, the BS 400 may further comprise a transmitter, or a transmitting circuitry 440, configured to transmit data to other apparatuses, such as the first UE 300.

Additionally, or alternatively, the BS 400 may further comprise a receiver, or a receiving circuitry 430, configured to receive data from other apparatuses, such as the first UE 300.

The memory circuitry 420 stores computer program code which, when run in the processing circuitry 410, causes the BS 400 to receive, from a first UE 300, a group BSR. The group BSR comprises at least one identifier identifying a request for SL transmissions within the assigned group and a request for cooperative UL group transmissions by the UEs within the assigned group to the BS 400 once the SL transmissions to the UEs within the assigned group are completed.

In some embodiments, the group BSR may comprise a first identifier identifying the request for SL transmissions within the assigned group and a second identifier identifying the request for cooperative UL group transmissions by the UEs within the assigned group to the BS 400.

In some embodiments, the group BSR may further comprise a third identifier identifying the assigned group comprising the plurality of UEs.

In some embodiments, the group BSR may comprise a fourth identifier identifying that the first UE 300 has sent the group BSR on behalf of at least one second UE 500.

In some embodiments, the received group BSR may comprise at least two initial BSRs aggregated into the group BSR. The at least two initial BSRs may originate from at least two second UEs 500 with data for group transmissions within the assigned group. The aggregated group BSR may, for example, comprise a fifth identifier identifying a number of UEs in the assigned group that have data for group transmission and a sixth identifier identifying a total size of buffers for the numbers of UEs. Alternatively, the aggregated group BSR may comprise at least one seventh identifier identifying the total buffer size of each of the at least two second UEs 500 with data for group transmission within the assigned group.

In some embodiments, the group BSR may further comprise at least one eighth identifier identifying the at least one UE initiating the group transmission.

In some embodiments, the memory circuitry 420 stores computer program code which, when run in the processing circuitry 410, may further cause the BS 400 to transmit, to the UE 300, grants for the SL and UL transmissions.

In some embodiments, the BS 400 may be an eNB. In other embodiments, the BS 400 may be a gNB.

According to a fifth aspect, there is provided a computer program comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

Figure 10:
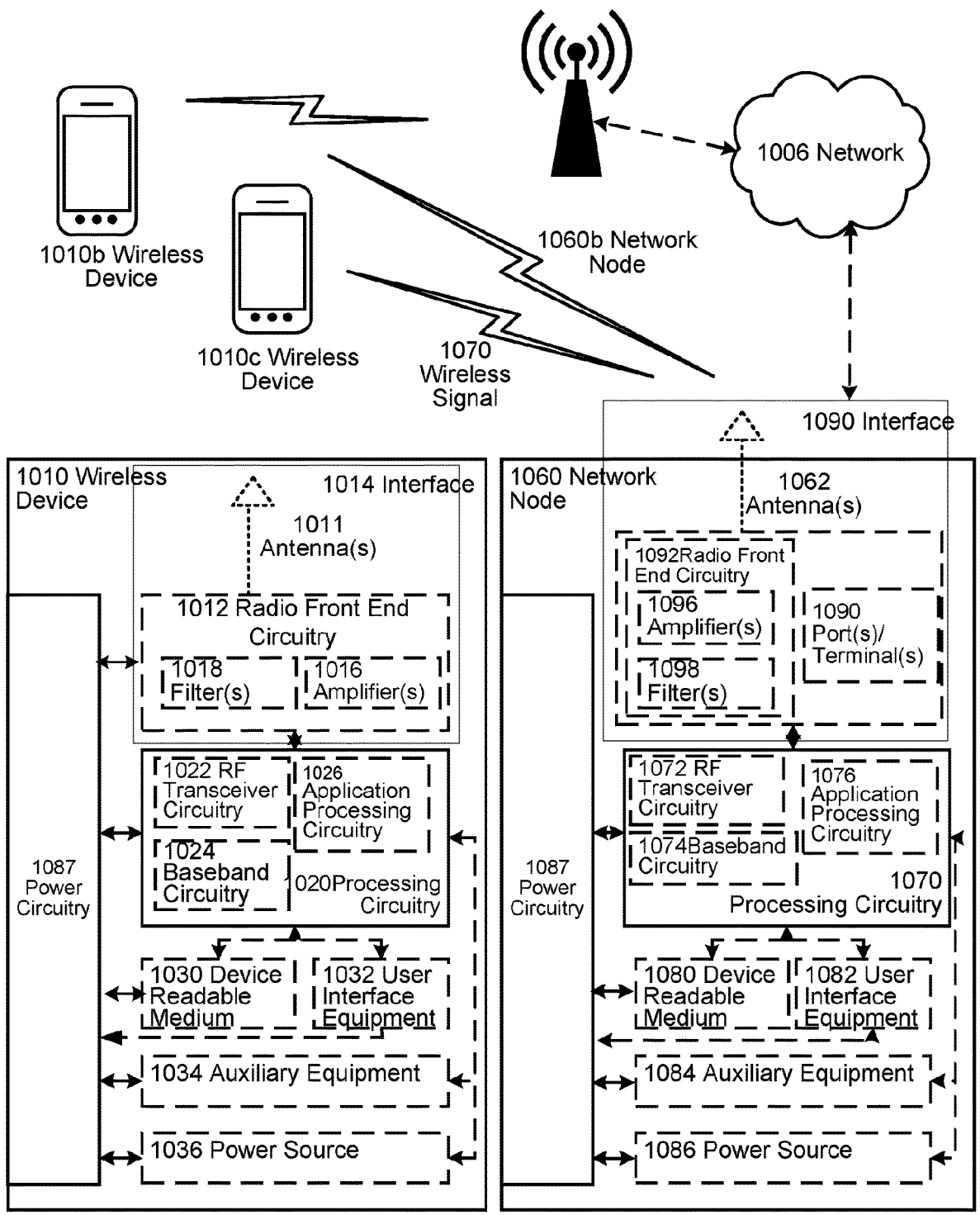
FIG. 10 illustrates an example wireless network.

Although the subject matter described herein may be implemented in any appropriate type of system using any suitable components, the embodiments described herein relate to a wireless network, such as the example wireless communication network illustrated in FIG. 10. For simplicity, the wireless communication network of FIG. 10 only depicts network 1006, network nodes 1060 and 1060b, and Wireless Devices (WDs) 1010, 1010b, and 1010c. The wireless communication network may further include any additional elements suitable to support communication between wireless devices or between a wireless device and another communication device, such as a landline telephone. Of the illustrated components, network node 1060 and wireless device (WD) 1010 are depicted with additional detail. The illustrated wireless communication network may provide communication and other types of services to one or more wireless devices to facilitate the wireless devices' access to and/or use of the services provided by the wireless communication network.

The wireless communication network may comprise and/or interface with any type of communication, telecommunication, data, cellular, and/or radio network or other similar type of system. In some embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components may work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless communication network to enable and/or provide wireless access to the wireless device and/or to perform other functions (e.g., administration) in the wireless communication network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, network node 1060 may be a virtual network node as described in more detail below. More generally, however, network nodes may represent any suitable device (or group of devices) capable, configured, arranged, and/or operable to enable and/or provide a wireless device with access to the wireless communication network or to provide some service to a wireless device that has accessed the wireless communication network.

In FIG. 10, Network node 1060 includes processing circuitry 1070, device readable medium 1080, interface 1090, user interface equipment 1082, auxiliary equipment 1084, power source 1086, power circuitry 1087, and antenna 1062. Although network node 1060 illustrated in the example wireless communication network of FIG. 10 may represent a device that includes the illustrated combination of hardware components, other embodiments may comprise network nodes with different combinations of components. It is to be understood that a network node may comprise any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network device may be provided by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 10100 may be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1013 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1013 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
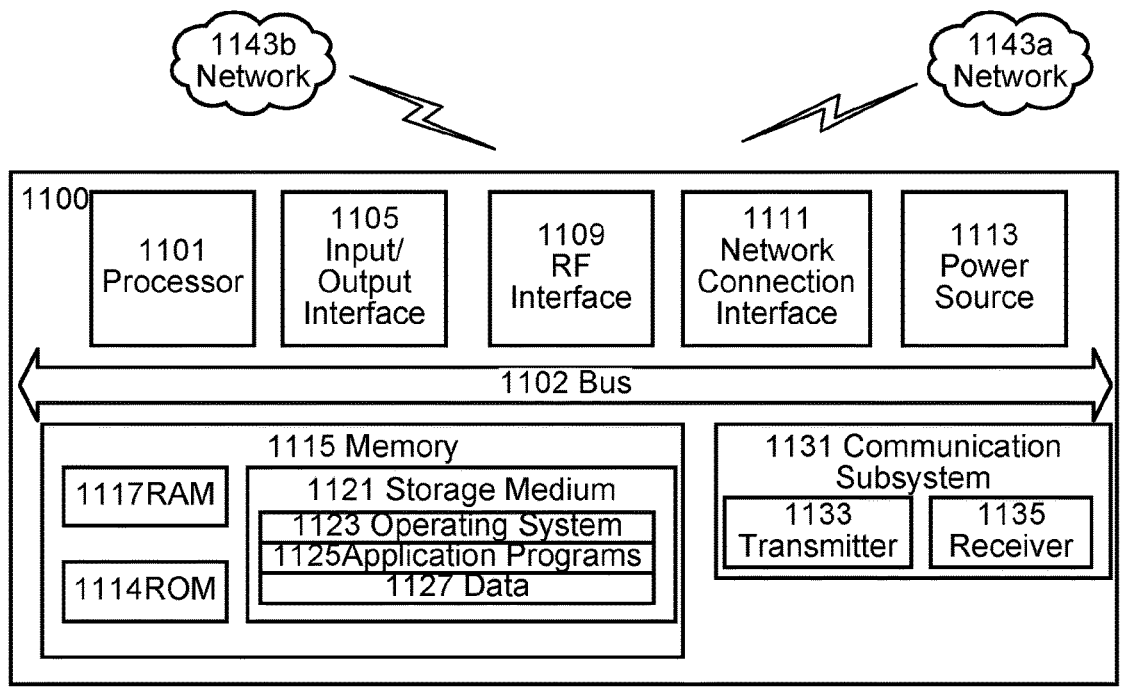
FIG. 11 shows a user equipment according to an embodiment.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1114, and storage medium 1121 or the like, communication subsystem 1131, power source 1113, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1114 may be configured to provide computer instructions or data to processing circuitry 1101. For example, ROM 1114 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power 5 source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
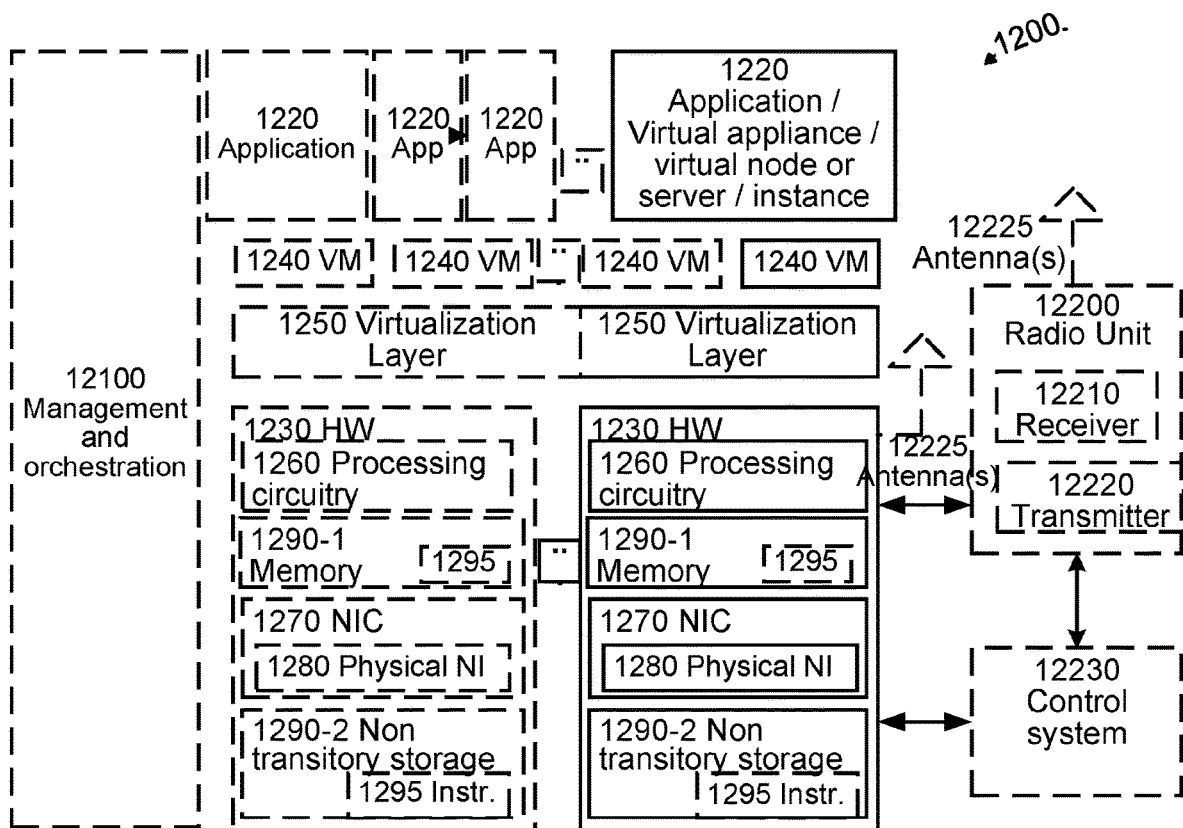
FIG. 12 shows a virtualization environment according to an embodiment.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analogue hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be affected with the use of control system 12230 which may alternatively be used for communication between the hardware nodes 1230 and radio units 12200.

Figure 13:
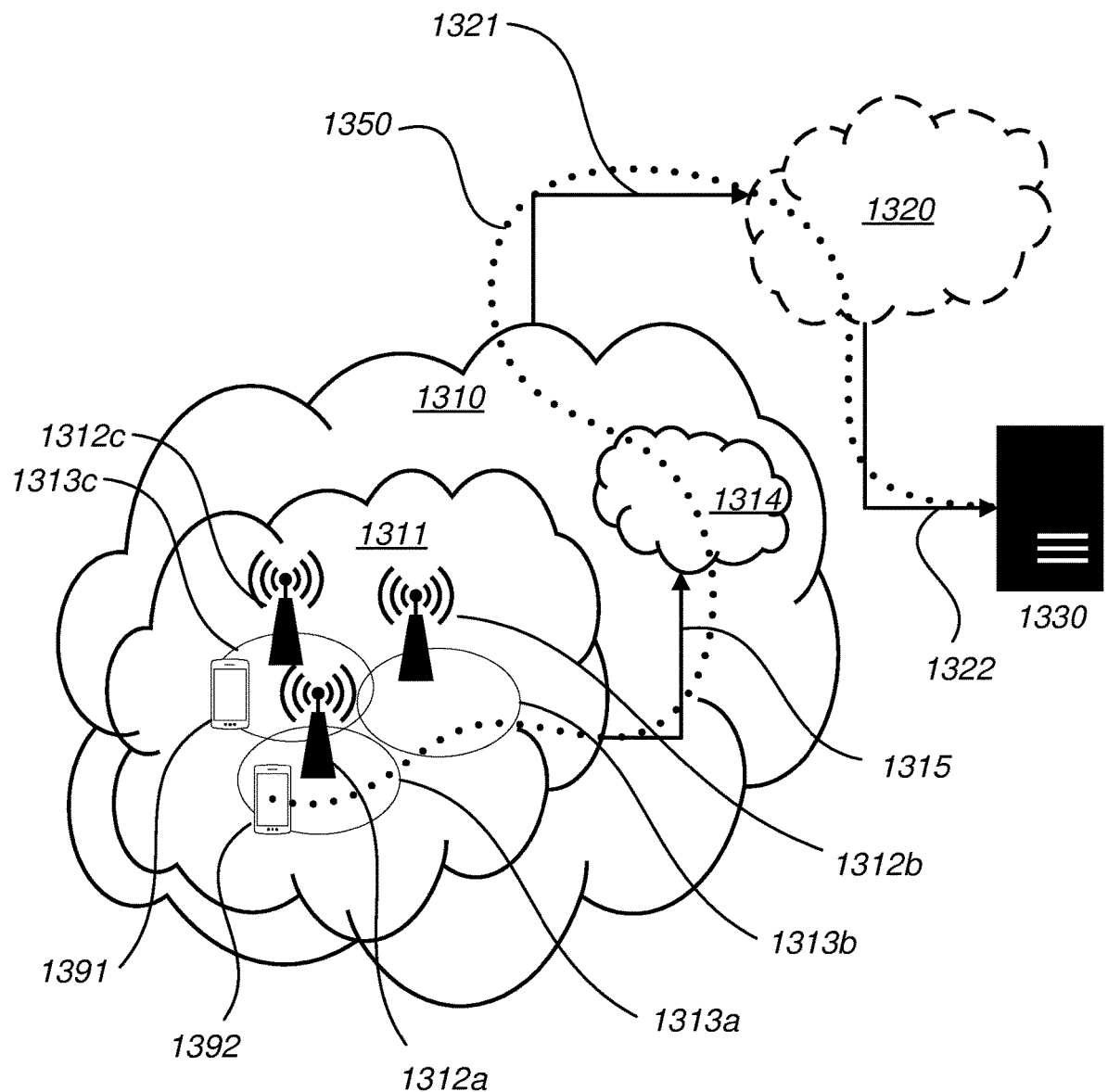
FIG. 13 illustrates an example telecommunication network connected via an intermediate network to a host computer.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1316 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct, or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
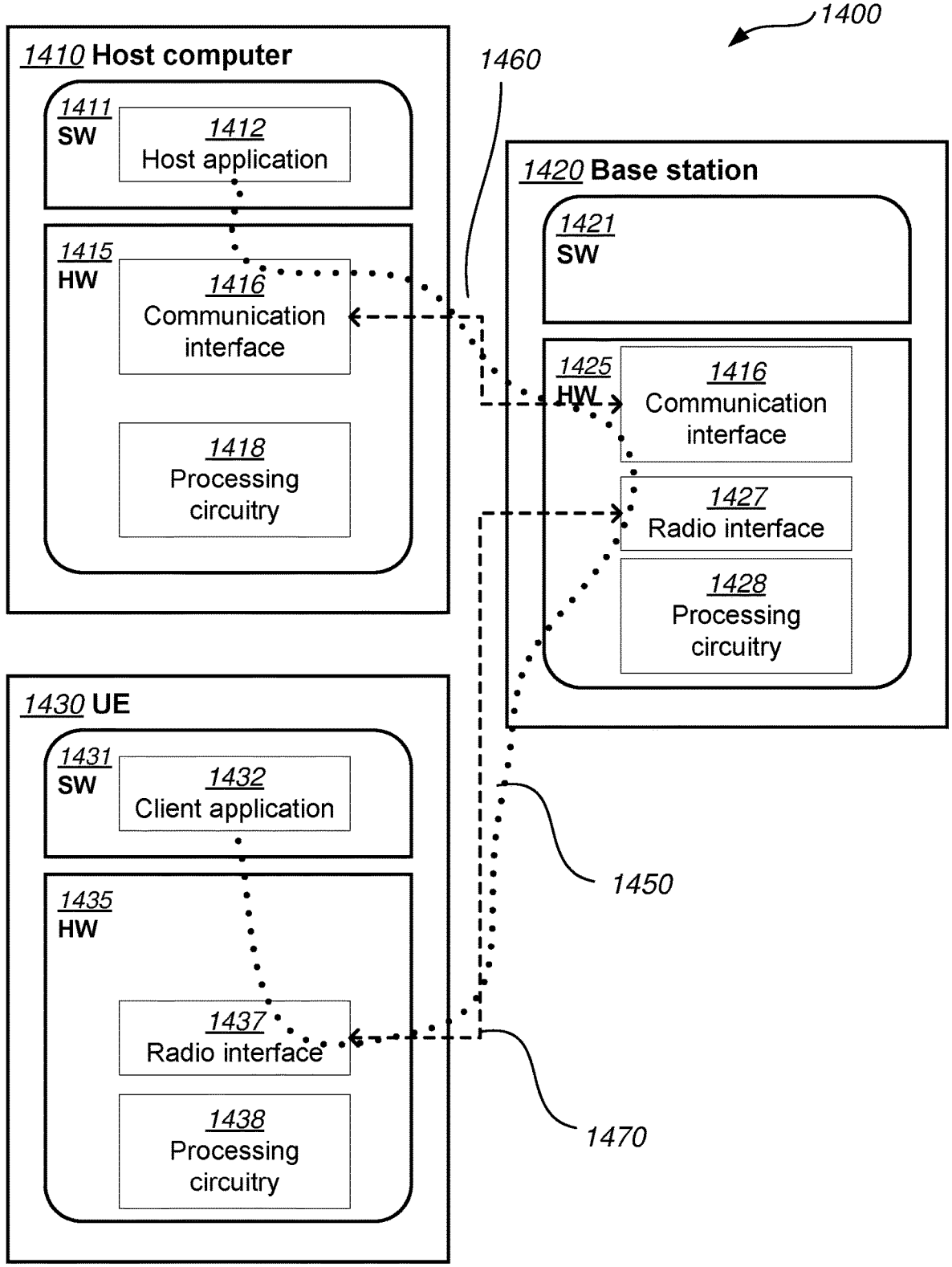
FIG. 14 shows a host computer communicating via a base station with a user equipment over a partially wireless connection according to an embodiment.

It is noted that host computer 1410, base station 1420 and UE 1430 illustrated in FIG. 14 may be similar or identical to host computer 1430, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the data rate and thereby provide benefits such as better responsiveness.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figures 15, 16:
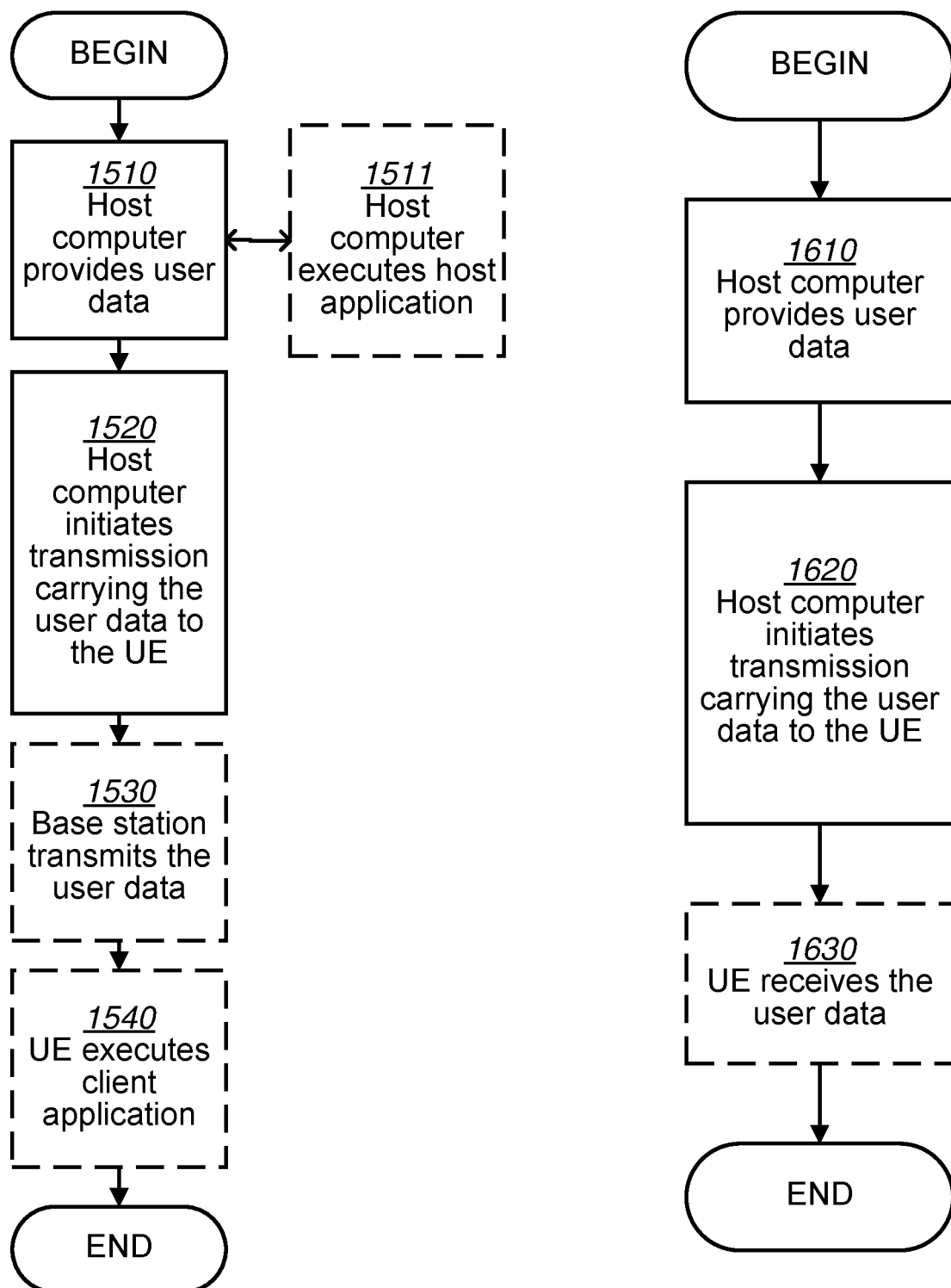
FIGS. 15 and 16 show example methods implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally, or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read-Only Memory (ROM), Random-Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

NUMBERED EMBODIMENTS IN PARTICULAR RELATED TO FIGS. 10-18

1. A Base Station (BS) configured to communicate with a User Equipment (UE), the BS comprising a radio interface and processing circuitry configured to:
   receive, from a first UE (300), a group BSR, wherein the group BSR comprises at least one identifier identifying a request for SideLink, SL, transmissions within the assigned group and a request for cooperative UpLink, UL, group transmissions by the UEs within the assigned group to the BS (400) once the SL transmissions to the UEs within the assigned group are completed.
2. The BS according to embodiment 1, wherein the group BSR comprises a first identifier identifying the request for SL transmissions within the assigned group and a second identifier identifying the request for cooperative UL group transmissions by the UEs within the assigned group to the BS.

3. The BS according to any of embodiment 1 and 2, wherein the group BSR further comprises a third identifier identifying the assigned group comprising the plurality of UEs.

4. The BS node according to any of embodiments 1 to 3, wherein the group BSR comprises a fourth identifier identifying that the first UE has sent the group BSR on behalf of at least one second UE.

5. The BS according to any of embodiments 1 to 4, wherein the received group BSR comprises at least two initial BSRs aggregated into the group BSR, wherein the at least two initial BSRs originates from at least two second UEs (500) with data for group transmissions within the assigned group.

6. The BS according to embodiment 5, wherein the aggregated group BSR comprises a fifth identifier identifying a number of UEs in the assigned group that have data for group transmission and a sixth identifier identifying a total size of buffers for the numbers of UEs.

7. The BS according to embodiment 5, wherein the aggregated group BSR comprises at least one seventh identifier identifying the total buffer size of each of the at least two second UEs with data for group transmission within the assigned group.

8. The BS according to any of embodiments 1 to 7, wherein the BS further is configured to:
transmit, to the UE, grants for the SL and/or UL transmissions.

9. The BS according to embodiment 8, wherein the received message comprises at least one second uplink pilot sequence proposed to be exchanged with the at least one first uplink pilot sequence.

10. A communication system including a host computer comprising:
processing circuitry configured to provide user data; and
a communication interface configured to forward the user data to a cellular network for transmission to a User Equipment (UE),
wherein the cellular network comprises a BS having a radio interface and processing circuitry, the BS's processing circuitry configured to receive, from a first UE, a group BSR, wherein the group BSR comprises at least one identifier identifying a request for SideLink (SL) transmissions within the assigned group and a request for cooperative UpLink (UL) group transmissions by the UEs within the assigned group to the BS once the SL transmissions to the UEs within the assigned group are completed.

11. The communication system of embodiment 13, further including the BS.

12. The communication system of embodiment 14, further including the UE, wherein the UE is configured to communicate with the BS.

13. The communication system of embodiment 15, wherein:
the processing circuitry of the host computer is configured to execute a host application, thereby providing the user data; and
the UE comprises processing circuitry configured to execute a client application associated with the host application.

14. A method implemented in a BS, comprising
receiving, from the first UE, a group BSR, wherein the group BSR comprises at least one identifier identifying a request for SideLink (SL) transmissions within the assigned group and a request for cooperative UpLink (UL) group transmissions of data by the UEs within the assigned group to the BS once the SL transmissions to the UEs within the assigned group are completed.

15. A method implemented in a communication system including a host computer, a BS and a User Equipment (UE), the method comprising:
at the host computer, providing user data; and
at the host computer, initiating a transmission carrying the user data to the UE via a cellular network comprising the BS, wherein the BS
receiving, from the first UE, a group BSR, wherein the group BSR comprises at least one identifier identifying a request for SideLink (SL) transmissions within the assigned group and a request for cooperative UpLink (UL) group transmissions of data by the UEs within the assigned group to the BS once the SL transmissions to the UEs within the assigned group are completed.

16. The method of embodiment 15, further comprising:
at the BS, transmitting the user data.

17. The method of embodiment 16, wherein the user data is provided at the host computer by executing a host application, the method further comprising: at the UE, executing a client application associated with the host application.

18. A User Equipment (UE) configured to communicate with a BS, the UE comprising a radio interface and processing circuitry configured to transmit and receive data to and from the BS.

19. A communication system including a host computer comprising:
processing circuitry configured to provide user data; and
a communication interface configured to forward user data to a cellular network for transmission to a User Equipment (UE),
wherein the UE comprises a radio interface and processing circuitry, the UE's processing circuitry configured to transmit and receive data to and from a BS.

20. The communication system of embodiment 19, further including the UE.

21. The communication system of embodiment 19, wherein the cellular network further includes a BS configured to communicate with the UE.

22. The communication system of embodiment 20 or 21, wherein:
the processing circuitry of the host computer is configured to execute a host application, thereby providing the user data; and
the UE's processing circuitry is configured to execute a client application associated with the host application.

23. A method implemented in a communication system including a host computer, a BS and a User Equipment (UE), the method comprising:
at the host computer, providing user data; and
at the host computer, initiating a transmission carrying the user data to the UE via a cellular network comprising the BS, wherein the UE transmits and receives to and from the BS.

24. The method of embodiment 23, further comprising:
at the UE, receiving the user data from the BS.
25. A communication system including a host computer comprising:
a communication interface configured to receive user data originating from a transmission from a User Equipment (UE) to a BS,
wherein the UE comprises a radio interface and processing circuitry, the UE's processing circuitry configured to transmit and receive data to and from the BS.
26. The communication system of embodiment 25, further including the UE.
27. The communication system of embodiment 26, further including the BS, wherein the BS comprises a radio interface configured to communicate with the UE and a communication interface configured to forward to the host computer the user data carried by a transmission from the UE to the BS.
28. The communication system of embodiment 26 or 27, wherein:
the processing circuitry of the host computer is configured to execute a host application;
and the UE's processing circuitry is configured to execute a client application associated with the host application, thereby providing the user data.
29. The communication system of embodiment 26 or 27, wherein:
the processing circuitry of the host computer is configured to execute a host application, thereby providing request data; and
the UE's processing circuitry is configured to execute a client application associated with the host application, thereby providing the user data in response to the request data.
30. A method implemented in a User Equipment (UE), comprising transmitting and receiving data to and from a BS.
31. The method of embodiment 30, further comprising:
providing user data; and
forwarding the user data to a host computer via the transmission to the BS.
32. A method implemented in a communication system including a host computer, a BS and a User Equipment (UE), the method comprising:
at the host computer, receiving user data transmitted to the BS from the UE, wherein the UE transmitting and receiving data to and from the BS.
33. The method of embodiment 32, further comprising:
at the UE, providing the user data to the BS.
34. The method of embodiment 33, further comprising:
at the UE, executing a client application, thereby providing the user data to be transmitted; and
at the host computer, executing a host application associated with the client application.
35. The method of embodiment 34, further comprising:
at the UE, executing a client application; and
at the UE, receiving input data to the client application, the input data being provided at the host computer by executing a host application associated with the client application, wherein the user data to be transmitted is provided by the client application in response to the input data.
36. A communication system including a host computer comprising a communication interface configured to receive user data originating from a transmission from a User Equipment (UE) to a Base Station (BS), wherein the BS comprises a radio interface and processing circuitry, the BS's processing circuitry configured to receive, from a first UE (300), a group BSR, wherein the group BSR comprises at least one identifier identifying a request for SideLink, SL, transmissions within the assigned group and a request for cooperative UpLink, UL, group transmissions by the UEs within the assigned group to the BS (400) once the SL transmissions to the UEs within the assigned group are completed.
37. The communication system of embodiment 36, further including the BS.
38. The communication system of embodiment 37, further including the UE, wherein the UE is configured to communicate with the BS.
39. The communication system of embodiment 38, wherein:
the processing circuitry of the host computer is configured to execute a host application;
the UE is configured to execute a client application associated with the host application, thereby providing the user data to be received by the host computer.
40. A method implemented in a communication system including a host computer, a first Base Station (BS) and a User Equipment (UE), the method comprising:
at the host computer, receiving, from the BS, user data originating from a transmission which the BS has received from the UE, wherein the UE transmits and receives data to and from the BS.
41. The method of embodiment 40, further comprising:
at the BS, receiving the user data from the UE.
42. The method of embodiment 41, further comprising: at the BS, initiating a transmission of the received user data to the host computer.
43. A first User Equipment (UE) configured to communicate with a Base Station (BS), the UE comprising a radio interface and processing circuitry configured to:
transmit, to the BS, a group BSR, wherein the group BSR comprises at least one identifier identifying a request for SideLink, SL, transmissions within the assigned group and a request for cooperative UpLink, UL, group transmissions of data by the UEs within the assigned group to the BS once the SL transmissions to the UEs within the assigned group are completed.
44. The UE according to embodiment 43, wherein the group BSR further comprises a first identifier identifying the request for SL transmissions within the assigned group and a second identifier identifying the request for cooperative UL group transmission of data by the UEs within the assigned group to the BS.
45. The UE according to any of embodiment 43 and 44, wherein the group BSR further comprises a third identifier identifying the assigned group comprising the plurality of UEs.
46. The UE according to any of embodiments 43 to 45, wherein the UE is configured to:
receive, from the BS, grants for the SL and/or UL transmissions
47. The UE according to any of embodiments 43 to 46, wherein the UE is configured to:
receive, from at least one second UE within the group, at least one initial BSR to be transmitted to the BS; and
convert the received at least one initial BSR into the group BSR.

48. The UE according to embodiment 47, wherein the group BSR comprises a fourth identifier identifying that the first UE has sent the group BSR on behalf of the at least one second UE.
49. The UE according to any of embodiments 47 and 48, wherein at least two initial BSRs are received from at least two second UEs (500) within the assigned group.
50. The UE according to embodiment 49, wherein the UE is configured to:
   aggregate the received at least two initial BSRs into the group BSR.
51. The UE according to embodiment 50, wherein the aggregated group BSR comprises a fifth identifier identifying a number of UEs in the assigned group that have data for group transmissions and a sixth identifier identifying a total size of buffers for the number of UEs.
52. The UE according to embodiment 50, wherein the aggregated group BSR comprises at least one seventh identifier identifying the total buffer size of each of the at least two second UEs.
53. The UE according to any of embodiments 43 to 52, wherein the group BSR further comprises at least one eighth identifier identifying the at least one UE initiating the group transmission.
54. A method implemented in a User Equipment, comprising
   transmitting, to a BS, a group BSR, wherein the group BSR comprises at least one identifier identifying a request for SideLink, SL, transmissions within the assigned group and a request for cooperative UpLink, UL, group transmissions of data by the UEs within the assigned group to the BS once the SL transmissions to the UEs within the assigned group are completed.
55. A method implemented in a communication system including a host computer, a second network node and a User Equipment (UE), the method comprising:
   at the host computer, providing user data; and
   at the host computer, initiating a transmission carrying the user data to the UE via a cellular network comprising the second network node, wherein the UE
      transmitting, to a BS, a group BSR, wherein the group BSR comprises at least one identifier identifying a request for SideLink, SL, transmissions within the assigned group and a request for cooperative UpLink, UL, group transmissions of data by the UEs within the assigned group to the BS once the SL transmissions to the UEs within the assigned group are completed.
56. The method of embodiment 55, further comprising:
   at the UE, transmitting the user data.
57. The method of embodiment 56, wherein the user data is provided at the host computer by executing a host application, the method further comprising:
   at the UE, executing a client application associated with the host application.
58. A User Equipment (UE) configured to communicate with a BS, the UE comprising a radio interface and processing circuitry configured to transmit and receive data to and from the BS.
59. A communication system including a host computer comprising:
   processing circuitry configured to provide user data; and
   a communication interface configured to forward user data to a cellular network for transmission to a User Equipment (UE),
   wherein the UE comprises a radio interface and processing circuitry, the UE's processing circuitry configured to transmit and receive data to and from a BS.
60. The communication system of embodiment 59, further including the UE.
61. The communication system of embodiment 59, wherein the cellular network further includes a BS configured to communicate with the UE.
62. The communication system of embodiment 60 or 61, wherein:
   the processing circuitry of the host computer is configured to execute a host application, thereby providing the user data; and
   the UE's processing circuitry is configured to execute a client application associated with the host application.
63. A method implemented in a communication system including a host computer, a BS and a User Equipment (UE), the method comprising:
   at the host computer, providing user data; and
   at the host computer, initiating a transmission carrying the user data to the UE via a cellular network comprising BS, wherein the UE transmits and receives to and from the BS.
64. The method of embodiment 70, further comprising:
   at the UE, receiving the user data from the BS.
65. A communication system including a host computer comprising:
   a communication interface configured to receive user data originating from a transmission from a User Equipment (UE) to a BS,
   wherein the UE comprises a radio interface and processing circuitry, the UE's processing circuitry configured to transmit and receive data to and from the BS.
66. The communication system of embodiment 65, further including the UE.
67. The communication system of embodiment 66, further including the BS, wherein the BS comprises a radio interface configured to communicate with the UE and a communication interface configured to forward to the host computer the user data carried by a transmission from the UE to the BS.
68. The communication system of embodiment 66 or 67, wherein:
   the processing circuitry of the host computer is configured to execute a host application;
   and the UE's processing circuitry is configured to execute a client application associated with the host application, thereby providing the user data.
69. The communication system of embodiment 67 or 68, wherein:
   the processing circuitry of the host computer is configured to execute a host application, thereby providing request data; and
   the UE's processing circuitry is configured to execute a client application associated with the host application, thereby providing the user data in response to the request data.
70. A method implemented in a User Equipment (UE), comprising transmitting and receiving data to and from a BS.

71. The method of embodiment 70, further comprising:
  providing user data; and
    forwarding the user data to a host computer via the transmission to the BS.
72. A method implemented in a communication system including a host computer, a BS and a User Equipment (UE), the method comprising:
  at the host computer, receiving user data transmitted to the BS from the UE, wherein the UE transmitting and receiving data to and from the BS.
73. The method of embodiment 72, further comprising:
  at the UE, providing the user data to the B S.
74. The method of embodiment 73, further comprising:
  at the UE, executing a client application, thereby providing the user data to be transmitted; and
  at the host computer, executing a host application associated with the client application.
75. The method of embodiment 74, further comprising:
  at the UE, executing a client application; and
  at the UE, receiving input data to the client application, the input data being provided at the host computer by executing a host application associated with the client application, wherein the user data to be transmitted is provided by the client application in response to the input data.
76. A communication system including a host computer comprising a communication interface configured to receive user data originating from a transmission from a User Equipment (UE) to a BS, wherein the UE comprises a radio interface and processing circuitry, the UE's processing circuitry configured to transmit, to the BS, a group BSR, wherein the group BSR comprises at least one identifier identifying a request for SideLink, SL, transmissions within the assigned group and a request for cooperative UpLink, UL, group transmissions of data by the UEs within the assigned group to the BS (400) once the SL transmissions to the UEs within the assigned group are completed.
77. The communication system of embodiment 76, further including the BS.
78. The communication system of embodiment 84, further including the UE, wherein the UE is configured to communicate with the BS.
79. The communication system of embodiment 85, wherein:
  the processing circuitry of the host computer is configured to execute a host application;
  the UE is configured to execute a client application associated with the host application, thereby providing the user data to be received by the host computer.
80. A method implemented in a communication system including a host computer, a BS and a User Equipment (UE), the method comprising:
  at the host computer, receiving, from the BS, user data originating from a transmission which the BS has received from the UE, wherein the UE transmits and receives data to and from the BS.
81. The method of embodiment 80, further comprising:
  at the BS, receiving the user data from the UE.
82. The method of embodiment 88, further comprising:
  at the BS, initiating a transmission of the received user data to the host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method in a first User Equipment, UE, for transmitting group Buffer Status Reports, BSRs, for group transmissions to a Base Station, BS, in a wireless communication system, the wireless communication system comprising the BS and a plurality of UEs including the first UE, the plurality of UEs being assigned to a group, wherein at least one of the UEs within the assigned group has data for group transmission to the BS, the method comprising:
  transmitting, to the BS, a group BSR, wherein the group BSR comprises at least one identifier identifying a request for SideLink, SL, transmissions within the assigned group and a request for cooperative UpLink, UL, group transmissions of data by the UEs within the assigned group to the BS once the SL transmissions to the UEs within the assigned group are completed;
  wherein the group BSR further comprises a third identifier identifying the assigned group comprising the plurality of UEs.

2. The method according to claim 1, wherein the group BSR comprises a first identifier identifying the request for SL transmissions within the assigned group and a second identifier identifying the request for cooperative UL group transmissions of data by the UEs within the assigned group to the BS.

3. The method according to claim 1, wherein the method further comprises:
  receiving, from the BS, grants for the SL and/or UL transmissions.

4. The method according to claim 1, wherein the method further comprises:
  receiving, from at least one second UE within the assigned group, at least one initial BSR to be transmitted to the BS; and
  converting the received at least one initial BSR into the group BSR.

5. The method according to claim 4, wherein the group BSR comprises a fourth identifier identifying that the first UE has sent the group BSR on behalf of the at least one second UE.

6. The method according to claim 4, wherein at least two initial BSRs are received from at least two second UEs (500) within the assigned group.

7. The method according to claim 6, wherein the step of converting the received at least two initial BSRs into the group BSR comprises:
  aggregating the received at least two initial BSRs into the group BSR.

8. The method according to claim 7, wherein the aggregated group BSR comprises a fifth identifier identifying a number of UEs in the assigned group that have data for group transmissions and a sixth identifier identifying a total size of buffers for the number of UEs.

9. The method according to claim 7, wherein the aggregated group BSR comprises at least one seventh identifier identifying the total buffer size of each of the at least two second UEs.

10. The method according to claim 1, wherein the group BSR further comprises at least one eighth identifier identifying the at least one UE initiating the group transmission.

11. A method in a Base Station, BS, for receiving group Buffer Status Reports, BSRs, for group transmissions from a first User Equipment, UE, in a wireless communication system, the wireless communication system comprising the BS and a plurality of UEs including the first UE, the plurality of UEs being assigned to a group, wherein at least one of the UEs within the assigned group has data for group transmission to the BS, the method comprising:
  receiving, from the first UE, a group BSR, wherein the group BSR comprises at least one identifier identifying a request for SideLink, SL, transmissions within the assigned group and a request for cooperative UpLink, UL, group transmissions of data by the UEs within the assigned group to the BS once the SL transmissions to the UEs within the assigned group are completed;
  wherein the group BSR further comprises a third identifier identifying the assigned group comprising the plurality of UEs.

12. The method according to claim 11, wherein the group BSR comprises a first identifier identifying the request for SL transmissions within the assigned group and a second identifier identifying the request for cooperative UL group transmissions by the UEs within the assigned group to the BS.

13. The method according to claim 11, wherein the group BSR comprises a fourth identifier identifying that the first UE has sent the group BSR on behalf of at least one second UE.

14. A first User Equipment, UE, configured for transmitting group Buffer Status Reports, BSRs, for group transmissions to a Base Station, BS, in a wireless communication system, the wireless communication system comprising the BS and a plurality of UEs including the first UE, the plurality of UEs being assigned to a group, wherein at least one of the UEs within the assigned group has data for group transmission to the BS, the first UE comprises:
  a processing circuitry; and
  a memory circuitry storing computer program code which, when run in the processing circuitry, causes the first UE to:
  transmit, to the BS, a group BSR, wherein the group BSR comprises at least one identifier identifying a request for SideLink, SL, transmissions within the assigned group and a request for cooperative UpLink, UL, group transmissions of data by the UEs within the assigned group to the BS once the SL transmissions to the UEs within the assigned group are completed;
  wherein the group BSR further comprises a third identifier identifying the assigned group comprising the plurality of UEs.

15. A Base Station, BS, configured for receiving group Buffer Status Reports, BSRs, for group transmissions from a first User Equipment, UE, in a wireless communication system, the wireless communication system comprising the BS and a plurality of UEs including the first UE, the plurality of UEs being assigned to a group, wherein at least one of the UEs within the assigned group has data for group transmission to the BS, the BS comprises:
  a processing circuitry; and
  a memory circuitry storing computer program code which, when run in the processing circuitry, causes the BS to:
  receive, from a first UE, a group BSR, wherein the group BSR comprises at least one identifier identifying a request for SideLink, SL, transmissions within the assigned group and a request for cooperative UpLink, UL, group transmissions by the UEs within the assigned group to the BS once the SL transmissions to the UEs within the assigned group are completed;
  wherein the group BSR further comprises a third identifier identifying the assigned group comprising the plurality of UEs.

* * * * *